United States Patent
Lehning

(10) Patent No.: US 10,825,335 B2
(45) Date of Patent: Nov. 3, 2020

(54) SYSTEM AND METHOD FOR THE VERIFIED DETERMINING OF A FIRE STATUS, AS WELL AS VEHICLE AND CENTRAL UNIT FOR THIS PURPOSE

(71) Applicant: MINIMAX GMBH & CO. KG, Bad Oldesloe (DE)

(72) Inventor: Ralf Lehning, Bad Oldesloe (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 30 days.

(21) Appl. No.: 16/316,570

(22) PCT Filed: Jun. 15, 2017

(86) PCT No.: PCT/EP2017/064664
§ 371 (c)(1),
(2) Date: Jan. 9, 2019

(87) PCT Pub. No.: WO2018/010909
PCT Pub. Date: Jan. 18, 2018

(65) Prior Publication Data
US 2019/0228641 A1 Jul. 25, 2019

(30) Foreign Application Priority Data

Jul. 12, 2016 (DE) .......... 10 2016 212 643

(51) Int. Cl.
*G08B 17/00* (2006.01)
*G08B 29/14* (2006.01)
(Continued)

(52) U.S. Cl.
CPC .......... *G08B 29/145* (2013.01); *B64C 39/024* (2013.01); *G08B 17/00* (2013.01);
(Continued)

(58) Field of Classification Search
None
See application file for complete search history.

(56) References Cited

U.S. PATENT DOCUMENTS 5,832,187 A * 11/1998 Pedersen ............... G06Q 10/06
706/45
6,281,970 B1 * 8/2001 Williams ............... G01C 21/00
250/334
(Continued)

FOREIGN PATENT DOCUMENTS

| KR | 2013 0098592 | 9/2013 |
|---|---|---|
| KR | 2014 0127574 | 11/2014 |
| WO | WO 2015/029007 | 3/2015 |

OTHER PUBLICATIONS

International Searching Authority, International Search Report in German & English translation in International Appln. No. PCT/EP2017/064664, dated Sep. 19, 2017, 5 pages.

*Primary Examiner* — John F Mortell
(74) *Attorney, Agent, or Firm* — Perkins Coie LLP

(57) ABSTRACT

The invention relates to a system (20) for determining a verified fire status, having: an unmanned vehicle (2) comprising a vehicle sensor unit (6) for capturing a fire parameter $K_F$, a central unit (22) for transmitting an instruction signal $S_I$ to the vehicle, and a stationary fire detector (14) comprising a fire detector sensor unit (28) for capturing a reference fire parameter $K_R$ of a fire detector monitoring area (12), wherein the fire detector (14) is designed for determining a reference fire status $Z_R$ and for transmitting a corresponding fire detector signal $S_B$ to the central unit (22), wherein the vehicle (2) is designed for navigating to the target location (16) on the basis of the transmitted instruction signal $S_I$, for capturing the fire parameter $K_F$ as a verification fire parameter $K_V$ of the fire detector monitoring area (12) at the target location (16), and for determining a corresponding (Continued)

verification fire status $Z_V$, and wherein the vehicle (2) is designed for transmitting a corresponding verification signal $S_V$ to the central unit (22), which can determine the reference fire status $Z_R$ as verified reference fire status $Z_{VR}$, if the reference fire status $Z_R$ and the verification fire status $Z_V$ correspond. The invention furthermore relates to a vehicle, a method, and a central unit, each corresponding to the system (20).

21 Claims, 16 Drawing Sheets

(51) Int. Cl.
  *B64C 39/02* (2006.01)
  *G08B 29/16* (2006.01)
  *G08B 29/18* (2006.01)
  *G08B 17/06* (2006.01)
(52) U.S. Cl.
  CPC ............ *G08B 17/06* (2013.01); *G08B 29/16* (2013.01); *G08B 29/188* (2013.01); *B64C 2201/027* (2013.01); *B64C 2201/12* (2013.01); *B64C 2201/127* (2013.01)

(56) References Cited

U.S. PATENT DOCUMENTS

| | | | | |
|---|---|---|---|---|
| 6,364,026 | B1* | 4/2002 | Doshay | A62C 3/0271 |
| | | | | 169/36 |
| 9,373,014 | B1* | 6/2016 | Mehranfar | G05D 1/104 |
| 10,139,819 | B2* | 11/2018 | Hollida | H04N 5/23293 |
| 2005/0139363 | A1* | 6/2005 | Thomas | A62C 3/025 |
| | | | | 169/30 |
| 2009/0120653 | A1* | 5/2009 | Thomas | A62C 5/02 |
| | | | | 169/61 |
| 2009/0252196 | A1* | 10/2009 | Icove | G08B 13/189 |
| | | | | 374/122 |
| 2010/0071917 | A1* | 3/2010 | Lalouz | A62C 3/0292 |
| | | | | 169/60 |
| 2012/0261144 | A1* | 10/2012 | Vian | G05D 1/0088 |
| | | | | 169/43 |
| 2012/0299751 | A1* | 11/2012 | Verna | H04W 4/14 |
| | | | | 340/945 |
| 2013/0099048 | A1* | 4/2013 | Fisher | B64C 39/024 |
| | | | | 244/12.1 |
| 2014/0027131 | A1* | 1/2014 | Kawiecki | G08B 17/005 |
| | | | | 169/45 |
| 2016/0272317 | A1* | 9/2016 | Cho | G08G 1/162 |

* cited by examiner

SYSTEM AND METHOD FOR THE VERIFIED DETERMINING OF A FIRE STATUS, AS WELL AS VEHICLE AND CENTRAL UNIT FOR THIS PURPOSE

This application is a 35 U.S.C. § 371 application of International Application No. PCT/EP2017/064664, filed Jun. 15, 2017, which claims the benefit of German Application No. 10 2016 212 643.1 filed Jul. 12, 2016, each of which is incorporated by reference in its entirety.

The invention relates to a system and a method for determining a verified fire status, as well as an unmanned vehicle and a central unit, which can each be used for the mentioned system.

Fire detection installations, which are also referred to as fire detection systems, are known from the prior art. The fire detection installations serve for the early detection of a fire, in order to initiate counter measured based thereon.

So-called fire detectors are used to detect a fire. They are preferably so-called automatic fire detectors. The fire detector can transmit a signal, which corresponds to the detected fire, to a fire detector control center. The fire detector control center can then trigger an alarm signal and/or initiate follow-up actions. The detected fire can subsequently be extinguished by means of an extinguishing installation.

Fire detectors are often installed in buildings and/or areas, which are at risk. A fire detector can thus be installed, for example, in a factory building. Smoke and/or heat developments can occur thereby, which are caused by common production processes. It can thus happen that an apparent fire is detected by the fire detector, even though there is in fact no fire. In other words, a faulty detection can occur by means of a fire detector. After the transmission of a corresponding signal from the fire detector to the fire detector control center, this then leads to a so-called false alarm. It has been found in practice that it is not uncommon that fire detectors wrongly detect a fire even though there is not fire. False alarms can thus occur with the same frequency.

If an extinguishing action is initiated by means of an extinguishing installation due to a false alarm, damages can occur in the area, which is wrongly extinguished by the extinguishing installation. To avoid such damages, an area, for which the fire detector has detected the fire, is often inspected on site after the receipt of the alarm signal in the fire detector control center, in order to verify whether the fire has been detected correctly or possibly wrongly by the fire detector. The person conducting the inspection then reports the result of the review to a further person, who has access to the fire detector control center by means of an input unit. Only if the fire has been verified or confirmed, respectively, by the above-described process, a follow-up action, such as for example the extinguishing of the fire, takes place on the basis of this. If, in contrast, the person performing the on-site inspection does not confirm the fire allegedly detected by the fire detector, if it is thus a false detection, this information is also transmitted to the further person at the fire detector control center, so that the follow-up action, such as the extinguishing of the alleged fire, can be prevented. This provides the advantage that possible consequential damages caused by an unnecessary extinguishing can be prevented.

A certain time can pass between the arrival of a signal from a fire detector about a detected fire and the arrival of the person at the location, for which the fire detector has detected the fire. The length of the certain time can thereby vary, in particular depending on the location for which the fire was detected and who is responsible for the mentioned on-site inspection. However, a prompt firefighting would be desired in order to avoid property damages and/or personal injuries, if possible, in the case of an actual fire, because an actual fire can often lead to exponentially rising property damages and/or personal injuries as time goes by.

In light of the foregoing, it is known from the prior art to provide fixedly installed cameras to monitor areas, which are also monitored by fire detectors. If a fire detector now detects a fire, it can be reviewed by means of a camera, whether a corresponding fire does in fact or does not prevail. Due to the high expenditure for the acquisition and/or installation of corresponding, fixedly installed cameras as well as due to legal limitations with regard to the protection of the corresponding video data, such cameras are only used rarely.

KR 102 014 012 7574 A discloses a fire monitoring system, which uses an unmanned aircraft (UAV) to reduce false fire detections. The fire monitoring system has a fire monitoring unit, which determines an assumed fire area by analyzing an image of a surrounding area and generates a UAV control signal according to the image analysis. UAV control signal is generated by a control signal generating module.

A UAV control unit, which receives the UAV control signal from the fire monitoring unit, controls the UAV on the basis of the received UAV control signals. By means of the controller of the UAV control unit, the UAV of the system moves to the assumed fire area to obtain an image, to detect flames, and to determine, whether a fire has broken out in the corresponding assumed fire area, wherein the fire monitoring unit has a first camera module for receiving an image. An image analysis module, which determines an assumed fire area on the basis of the image received from the first camera module, calculates the location information of the assumed fire area on the basis of an electronic map, which is included in a geographic location information database.

KR 102 014 012 7574 A further discloses a first communication module, which receives a control signal with regard to the fire monitoring from a control server, and transmits the received image, including the assume fire area and the information analyzed by the image analysis module to the control server, and transmits the received image, including the assumed fire area and the UAV control signal generated by the signal-generating module to the UAV controller. The limitation to image data analysis for the fire detection and the missing integration in fire detection systems, which have a central unit and stationary fire detectors, are disadvantages of this solution.

The invention is thus based on the object of providing a system, a method and/or a device, which provides/provide for a cost-efficient, quick and/or versatile review of a fire detected by a fire detector.

According to a first aspect of the invention, the mentioned object is solved by means of a system comprising the features of claim 1. Advantageous embodiments of the system and preferred embodiments of the system are described in the corresponding subclaims and in the description below.

A system for determining a verified fire status is proposed, which is preferably identified as verified reference fire status. The system has a central unit, a stationary fire detector and an unmanned vehicle. The stationary fire detector is also referred to as fire detector. The fire detector has a fire detector sensor unit, which is designed for capturing a reference fire parameter of a fire detector monitoring area. The fire detector is designed for determining a reference fire status by evaluating the reference fire parameter. The fire detector is designed for transmitting a fire detector signal, which represents the reference fire status, to the central unit. The central unit is configured for transmitting an instruction signal to the vehicle, in the event that the fire detector signal, which is transmitted by the fire detector, represents a reference fire status, which needs to be verified. The vehicle has a vehicle sensor unit, which is designed for capturing a fire parameter of a vehicle monitoring area. The instruction signal represents at least one target location for the vehicle. The fire monitoring area is in sufficient overlap with the fire detector monitoring area, when the vehicle is at the target location. The vehicle is designed for navigating, in particular independently, to the target location, on the basis of the transmitted instruction signal, so that the vehicle monitoring area and the fire detector monitoring area overlap sufficiently. The vehicle is configured for capturing the fire parameter at the target location by means of the vehicle sensor unit as a verification fire parameter of the fire detector monitoring area. The vehicle is designed for determining a verification fire status by evaluating the verification fire parameter.

According to a first embodiment alternative of the system, it is provided that the vehicle is designed for transmitting a verification signal, which represents the verification fire status, to the central unit, and the central unit is configured for determining the reference fire status as verified reference fire status, in the event that the reference fire status and the verification fire status correspond at least sufficiently.

According to a second embodiment alternative of the system, it is provided that the instruction signal furthermore represents the reference fire status, that the vehicle is configured for determining the reference fire status as verified reference fire status, in the event that the reference fire status and the verification fire status correspond at least sufficiently, and the vehicle is designed for transmitting a verification signal, which represents the verified reference fire status, to the central unit.

Both of the above-described embodiment alternatives of the system preferably form alternative embodiments for the system, as it has been explained above.

The system provides the advantage that a reference fire status, which is determined by a fire detector, can be reviewed by means of a verification fire status determined by a vehicle, and that, provided that the mentioned statuses correspond at least sufficiently, a verified reference fire status can be determined. The system thus allows for a determination of a verified fire status, namely of the verified reference fire status. A transmitting of sensor data from the vehicle to the central unit can thus be forgone. A signal connection between the vehicle and the central unit, which is preferably designed as radio connection, thus does not need to be suitable to be able to transmit large amounts of data within a short time. This is so, because the verified reference fire status can instead be determined at the target location by means of the vehicle, or the vehicle transmits a verification signal, which represents the verification fire status, to the central unit, so that the central unit can possibly determine the verified reference fire status.

A further advantage of the system is the automatic determination of the verified reference fire status as such. This is so, because the verification fire status can be determined by the vehicle itself and an automatic review of the reference fire status can take place on the basis of this, so that the verified reference fire status can be determined automatically in the case of a sufficient correspondence. This can take place without human intervention, so that the determination of the verified reference fire status can take place particularly quickly and safely.

The system can furthermore be used in a cost-efficient and simultaneously in a particularly flexible and/or versatile manner. This is so, because the vehicle can navigate, in particular drive, to any target locations. The vehicle of the system can thus be used to capture a verification fire parameter of a fire detector monitoring area of any fire detector. This is so, because the vehicle is mobile and is thus not bound or arranged stationarily, respectively. It is thus no longer necessary to provide an additional monitoring system, such as for example a stationarily installed camera system, for each fire detector or for a group of fire detectors in a monitoring area, in order to review or to verify, respectively, a reference fire status determined by the respective fire detector. Due to the small effort for only one vehicle and due to the mobility of the vehicle, the system can be used in a particularly cost-efficient and flexible manner.

The system is furthermore suitable and/or designed for automatically determining the verified reference fire status. This is so, because the verified reference fire status is only determined, when the verification fire status determined by the vehicle corresponds at least sufficiently with the reference fire status determined by the fire detector. In other words, the system is suitable to review the reference fire status determined by the fire detector by means of the verification fire status determined by the vehicle, and to determine it as being verified, when a corresponding correspondence results from the review. The verified reference fire status can thus be used reliably or can serve as basis for initiating a follow-up action, such as for example an extinguishing of a fire in the fire detector monitoring area.

The system can form at least a part of a fire detection system. A fire detector system is preferably also referred to as fire detector installation. The system or the fire detection system, respectively, can thus also serve as preventive fire protection.

The central unit can be designed as a device. The central unit can be assigned to a fire detector control center, can form a part of a fire detector control center, or can be the fire detector control center. An extinguishing control center can thereby be assigned to the fire detector control center. The fire detector control center and the extinguishing control center can thereby at least partially be designed jointly and/or integrally. The fire detector control center and/or the extinguishing control center can each be designed as a device, preferably at least partially, as an integral device. It can furthermore be provided that the control unit is assigned to a control system installation, which can also be referred to as control center. A control center installation can serve and/or be designed for the coordination or control of firefighting actions. The above-described designs provide the advantage that the central unit can be integrated in an existing system and/or an existing installation. This is the case, for example, when the central unit is formed by a fire detector and/or extinguishing control center.

Fire detectors are generally known from the prior art. For the system, it is provided that at least one fire detector is installed stationarily. Such a fire detector can for example be fixedly installed in a building, on a building or on an object to be protected, or in the vicinity thereof. The stationary fire detector will hereinafter also be referred to as fire detector. The fire detector can, for example, be formed as a combustion gas detector, a smoke detector, a heat detector, a flame detector, a detector for detecting an electromagnetic radiation from a predetermined spectrum, which preferably allows drawing a conclusion to a fire, or a combination of the above-mentioned detectors.

The fire detector has a fire detector sensor unit. The fire detector sensor unit is preferably designed in the manner of a sensor or of a sensor unit, respectively. The fire detector sensor unit is also designed for detecting a fire parameter of a fire detector monitoring area. The fire parameter detected by the fire detector sensor unit is referred to as reference fire parameter. A fire parameter can thereby generally represent and/or characterize at least one physical and/or chemical property of a combustion process. For a preferred design, it can be provided that the fire detector sensor unit is designed in the manner of a multi-sensor unit or comprising a plurality of, in particular different sensors, respectively. The sensor signals and/or sensor data of the multi-sensor or of the plurality of sensors, respectively, can be evaluated by means of a preprocessing unit, in particular on the basis of stored signal patterns or data, respectively, in order to detect a corresponding number of fire parameters resulting therefrom, which are referred to as reference fire parameters. In particular neuronal networks can be used for the evaluation. The fire detector sensor unit can be designed and/or configured accordingly for this purpose. If the fire detector is installed stationarily, the fire detector monitoring area is preferably also a stationary fire detector monitoring area. The fire detector monitoring area is preferably an area, which is assigned to the fire detector and which the fire detector is to preferably monitor for a fire, a fire precursor and/or a smoldering fire. The fire detector is preferably a so-called automatic fire detector. This is so, because the reference fire parameter of the fire detector monitoring area can be detected automatically by means of the fire detector sensor unit. The detection can thereby take place continuously or discretely, for example in predetermined time intervals.

Depending on the intended use, the fire detector sensor unit can be designed for capturing different reference fire parameters. One example for a reference fire parameter is, for example, the temperature. In this case, the fire detector sensor unit can be designed for capturing the temperature of the fire detector monitoring area. The fire detector sensor unit can in this case be designed as a temperature sensor unit or as a temperature sensor. The same applies for the following, possible fire parameters. A fire parameter can thus, for example, be a smoke concentration, which is also referred to as smoke particle concentration, a concentration of a predetermined gas, a concentration of a plurality of predetermined gases, a concentration of at least one thermal decomposition product or an, in particular, middle amplitude of a predetermined electromagnetic spectral range. A fire parameter can also be a change and/or slope value of at least one of the above-mentioned fire parameters. The fire parameter can thus, for example, be a temperature gradient or a concentration gradient. To capture a concentration of a gas, the fire detector sensor unit can be designed, for example, as a gas sensor unit or as a gas sensor. If the fire detector sensor unit serves for capturing an amplitude of a predetermined electromagnetic spectral range, the fire detector sensor unit can be designed as an optical and/or photoelectric sensor unit for capturing a corresponding, in particular middle, amplitude of the predetermined electromagnetic spectral range. This spectral range can, for example, originate from the ultraviolet, the infrared and/or from the near infrared range.

The captured reference fire parameter thus provides information as to whether a fire, a fire precursor or a smoldering fire prevails in the fire detector monitoring area. A fire can thereby be understood to be a combustion process, which is associated with a light appearance, such as, for example, a blaze, a flame, an ember, a glimmering and/or sparking. A smoldering fire can thereby be understood to be a combustion process without a light appearance. A fire precursor can thereby be understood to be a process, in which thermal decomposition products are created, namely for example by means of a reduction reaction and/or a homolysis. An oxidation or an oxidation reaction, respectively, preferably does not take place in response to the corresponding thermal decomposition. It can happen, in practice, that the generic term "fire" is used for the above-identified fire, the smoldering fire and the fire precursor.

On the basis of the captured reference fire parameter, namely preferably on the basis of the at least one captured reference fire parameter, the fire detector is designed for determining a reference fire status. For this purpose, the reference fire parameter is evaluated by the fire detector. The fire detector can have an evaluation unit for the evaluation. The evaluation unit can be designed in the manner of a data processing unit for evaluating the reference fire parameter. If the fire detector sensor unit captures, for example, the temperature of the fire detector monitoring area, the reference fire status can be determined by evaluation of the temperature by means of the fire detector. If the temperature exceeds, for example, a predetermined threshold value, this can be determined as a fire for the reference fire status. In particular in the case of a smoldering fire or in the case of a combustion process without a light appearance, a conclusion can be drawn that a fire precursor or a smoldering fire is to be determined as reference fire status, for example by capturing the concentration of a predetermined gas. If the fire detector sensor unit captures a reference fire parameter, which does not correspond to any fire and furthermore not to a fire precursor or a smoldering fire, no reference fire status is determined. The fire detector can be designed and/or configured accordingly for this purpose.

For a preferred embodiment, it can be provided that the fire detector sensor unit is designed in the manner of a multi-sensor unit or comprising a plurality of, in particular different sensors, respectively. The sensors or the multi-sensor unit, respectively, can be designed for determining a plurality of fire parameters, wherein these fire parameters are referred to as reference fire parameters. The fire detector can be designed for determining a reference fire status on the basis of the above-mentioned, captured reference fire parameters. The reference fire parameters are evaluated by the fire detector for this purpose. The fire detector can have an evaluation unit for the evaluation. The evaluation unit can be designed in the manner of a data processing unit for evaluating the reference fire parameters. In particular neuronal networks can be used for the evaluation.

When a reference fire status has been determined by the fire detector, the fire detector can transmit a fire detector signal, which represents the reference fire status, to the central unit. The fire detector can have a signal sending unit for this purpose. The central unit can have a signal receiving unit for this purpose. The fire detector signal can thus be transmitted to the signal receiving unit of the central unit by means of the sending unit of the fire detector, so that the fire detector signal or the reference fire status, respectively, is made available to the central unit. The sending unit can thereby be designed as radio sending unit and the signal receiving unit as radio signal receiving unit. In the alternative or in addition, a grid-bound signal connection can be designed between the signal sending unit and the signal receiving unit.

In other words, the central unit and the fire detector can be connected to one another by means of a wired signal connection and/or by means of a radio connection, in order to provide for the transmission of the fire detector signal. If a wired signal connection is used for transmitting the fire detector signal, the fire detector signal can be represented and/or modelled by a current signal and/or voltage signal. For this purpose, the current intensity and/or the voltage potential can be adapted by the fire detector in order to transmit the fire detector signal. The wired signal connection can lead from the central unit to a plurality of fire detectors, wherein the fire detectors are connected in series by means of the wired signal connection. This is also referred to as a fire detector line in this case. The wired signal connection can also be designed as a bus line. In this case, each of the plurality of the fire detectors each forms a bus subscriber. Each bus subscriber can have its own address, which is also referred to as bus address. As a whole, the bus subscribers and the bus line can thus form a bus system for transmitting information. The bus system is preferably designed as a ring bus system. The information is or relates for example to the fire detector signal. A fire detector can thus transmit the fire detector signal to the central unit by means of the bus line or the bus system, respectively. This can take place, for example, in bit serial form and in the half-duplex method. The fire detector signal or the corresponding data information, respectively, is thereby modulated to a bus supply voltage, which is provided by the central unit. The central unit demodulates the corresponding signals, so that the fire detector signal is available to the central unit.

It can be provided for an advantageous embodiment that the fire detector or at least one of the fire detectors, preferably each of the fire detectors, is supplied with electrical energy by the central unit. This can take place by means of the above-mentioned, wired signal connection. This is so, because said signal connection can also serve and/or be designed for transmitting electric power from the central unit to the respective fire detector. The central unit can thus provide, for example, a direct voltage, wherein signals are modulated by means of an alternating voltage.

The central unit is configured and/or designed for transmitting an instruction signal to the vehicle. The central unit is thus preferably designed for sending the instruction signal to the vehicle. The vehicle can accordingly be designed for receiving the instruction signal. For this purpose, the vehicle can have a signal receiving unit, in particular a radio signal receiving unit. For sending the instruction signal, the central unit can have a signal sending unit, in particular a radio signal sending unit. The central unit and the vehicle can thus preferably be connected to one another by means of a radio signal connection, in order to transmit the instruction signal from the central unit to the vehicle. However, the instruction signal is only transmitted to the vehicle, in the event that the fire detector signal, which is transmitted by the fire detector, represents a reference fire status, which needs to be verified. The reference fire status preferably needs to be verified, when the reference fire status represents a fire.

It can furthermore be provided that the reference fire status preferably needs to be verified, if said reference fire status corresponds to a fire, a fire precursor or a smoldering fire.

An advantageous embodiment of the system is characterized in that the central unit is configured that a reference fire status, thus a current reference fire status, needs to be verified, if at least one reference fire status has been transmitted beforehand, namely maximally at a predetermined, maximum time interval, from the fire detector or another fire detector to the central unit.

It can thus be provided that a reference fire status, which is transmitted to the central unit, does not initially need to be verified, until at least one further reference fire status is transmitted to the central unit. The two reference fire statuses can thereby originate from the same fire detector. In the alternative, it can be provided that the two reference fire statuses originate from different fire detectors, wherein each fire detector is designed for capturing a corresponding reference fire parameter of the same fire detector monitoring area. If, for example, a first fire detector now captures a first reference fire parameter for a fire detector monitoring area, and if, for example, a fire precursor is determined as first reference fire status on the basis of the first reference fire parameter, a first fire detector signal can be transmitted to the central unit, wherein the first fire detector signal represents the first reference fire status. Due to the preferred configuration of the central unit, no verification is provided for the first reference fire status. An instruction signal is then not yet transmitted to the vehicle. However, if the first fire detector or a second fire detector captures a second reference fire parameter for the same fire detector monitoring area and if a second reference fire status is determined on the basis of the second fire parameter, a second fire detector signal can be transmitted to the central unit, wherein the second fire detector signal represents the second reference fire status. The second reference fire status can thereby, for example, correspond to a fire. If the first fire detector signal and the second fire detector signal are transmitted to the central unit within the predetermined, maximum time interval, it is provided due to the preferred configuration of the central unit that the second reference fire status needs to be verified. This is why the transmission of the instruction signal to the vehicle then also takes place.

If the reference fire status now needs to be verified, the central unit transmits the instruction signal to the vehicle. The instruction signal thereby represents at least one target location for the vehicle. The target location can thereby be a location coordinate, have a location coordinate, represent a defined space, and/or represent an area. The target location can furthermore also have further location information, such as, for example, information for the alignment for the vehicle and/or for the vehicle sensor unit of the vehicle. The vehicle is thereby designed for navigating to the target location on the basis of the transmitted instruction signal. The instruction signal can simultaneously serve as command for starting the navigation to the target location and/or can similarly be evaluated and/or interpreted by the vehicle and/or the navigation unit. A further command for starting the navigation by means of the navigation control unit to the target location is thus not necessary. The navigation preferably refers to a steering, moving, driving or flying. For this purpose, the vehicle can have a navigation control unit for navigating to the target location by means of said navigation control unit. Particularly preferably, the vehicle is designed for independently navigating to the actual target location on the basis of the transmitted instruction signal or of the target location represented by the instruction signal, respectively. The target location is preferably at a predetermined distance from the fire detector monitoring area. It can be provided in the alternative that the target location lies in the fire detector monitoring area. The navigation control unit can furthermore be designed for receiving signals from a navigation satellite and/or from a pseudolite. On the basis of these signals and the instruction signal, or on the target location represented thereby, the navigation control unit is preferably designed for the controlled navigation of the vehicle to the target location. The vehicle can thus preferably navigate independently and/or on its own to the target location after receipt of the instruction signal.

The vehicle furthermore has a vehicle sensor unit. The vehicle sensor unit is designed for capturing, in particular at least one fire parameter of a vehicle monitoring area. For the fire parameter, reference is made analogously to the explanations for the reference fire parameter. It can be provided for a preferred embodiment that the vehicle sensor unit is designed in the manner of a multi-sensor unit or comprising a plurality of, in particular different sensors, respectively. The sensor signals and/or sensor data of the multi-sensor or of the plurality of sensors, respectively, can be evaluated by means of a preprocessing unit, in particular on the basis of stored signal patterns or data, respectively, in order to capture a corresponding number of fire parameters as a result thereof. In particular neuronal networks can be used for the evaluation. For this purpose, the vehicle sensor unit can be designed and/or configured accordingly. The vehicle sensor unit can thus be designed for capturing in particular a middle amplitude of a predetermined electromagnetic spectral range, a smoke concentration, a concentration of a predetermined gas, a concentration of a plurality of predetermined gases, a temperature and/or a concentration of at least one thermal decomposition product, namely as the fire parameter. The vehicle sensor unit is thereby designed for capturing the fire parameter of a vehicle monitoring area. The vehicle monitoring area can thereby be assigned to the vehicle sensor unit and/or to the vehicle in a stationary manner. If the vehicle moves, a corresponding movement of the vehicle monitoring area takes place.

If a navigation, thus preferably a guided movement of the vehicle to the target location has taken place, the vehicle monitoring area and the fire detector monitoring area are in sufficient overlap. This is so, because the vehicle is preferably at a predetermined distance to the fire detector monitoring area or even in the fire detector monitoring area at the target location. Due to the fact that the vehicle monitoring area also moves accordingly with the navigation of the vehicle, the sufficient overlap of the vehicle monitoring area with the fire detector monitoring area takes place, when the vehicle is at the target location. The vehicle monitoring area can thus also be referred to as vehicle-fixed or vehicle sensor unit-fixed monitoring area. The vehicle monitoring area can thus be characterized in that it can be captured by the vehicle sensor unit.

It is preferably provided that the vehicle monitoring area and the fire detector monitoring area are in sufficient overlap, when at least 30%, at least 40%, at least 50%, at least 60%, at least 70%, at least 80%, at least 90% or 100% of the vehicle monitoring area is in overlap with the fire detector monitoring area. The fire detector can determine a corresponding reference fire status and the vehicle can determine a corresponding verification fire status in the area, in which the vehicle monitoring area and the fire detector monitoring area overlap. The vehicle is thereby configured for capturing the fire parameter at the target location by means of the vehicle sensor unit as the verification fire parameter of the fire detector monitoring area, namely at least for that part of the fire detector monitoring area, which is in overlap with the vehicle monitoring area, wherein the vehicle is designed for determining a verification fire status by evaluating the verification fire parameter. The verification fire parameter thus forms a further or a second fire parameter, respectively, for the fire detector monitoring area. On the basis of this, the vehicle determines the verification fire status. In other words, the vehicle is designed for determining the verification fire status on the basis of the in particular at least one verification fire parameter. The verification fire status thus forms a second fire status for the fire detector monitoring area. This provides the advantage that two fire statuses, namely the reference fire status and the verification fire status, can be determined for the fire detector monitoring area.

It can be provided for a preferred embodiment that the vehicle sensor unit is designed in the manner of a multi-sensor unit or comprising a plurality of, in particular different sensors, respectively. The sensors or the multi-sensor unit, respectively, can be designed for determining a plurality of fire parameters, wherein these fire parameters are referred to as verification fire parameters. On the basis of the above-mentioned, captured verification fire parameters, the vehicle can be designed for determining a verification fire status. The verification fire parameters are evaluated by the vehicle for this purpose. For the evaluation, the vehicle can have an evaluation unit. The evaluation unit can be designed in the manner of a data processing unit for evaluating the verification fire parameters. In particular neuronal networks can be used for the evaluation.

According to the already mentioned, first embodiment alternative of the system, it is provided that the vehicle is designed for transmitting a verification signal, which represents the verification fire status, to the central unit, and that the central unit is configured for determining the reference fire status as verified reference fire status, in the event that the reference fire status and the verification fire status correspond at least sufficiently. For transmitting the verification signal, the vehicle can have a signal receiving unit, in particular a radio signal receiving unit. For receiving the verification signal, the central unit can have this one, in particular further signal receiving unit, which is preferably designed as a radio signal receiving unit. The signal sending unit and the signal receiving unit of the vehicle can be designed as a communication unit of the vehicle. The same applies for the central unit. The at least one signal sending unit and the at least one signal receiving unit can thereby be designed as a communication unit of the central unit. The vehicle and the central unit can thus be connected to one another by means of a signal connection, in particular a wireless signal connection or radio signal connection, in order to transmit the verification signal from the vehicle to the central unit.

The reference fire status has already been transmitted beforehand to the central unit by means of the fire detector signal. The central unit can thus be designed for evaluating the reference fire status and the verification fire status. This applies in particular for the evaluation whether the reference fire status and the verification fire status correspond at least sufficiently. A corresponding or sufficient correspondence, respectively, with regard to the reference fire status and the verification fire status can exist, for example, when the reference fire status and the verification fire status correspond and/or when the verification fire status corresponds to a fire. In the second case, the reference fire status can correspond, for example, to a smoldering fire or a fire precursor. A sufficient correspondence between the reference fire status and the verification fire status can thus exist, when the verification fire status corresponds to a fire and the reference fire status to a smoldering fire, a fire precursor and/or a fire. Even if the reference fire status and the verification fire status do not correspond exactly, a sufficient correspondence can nonetheless be assumed, when the verification fire status represents a fire, because the fire process can have further developed in a transition time, while the vehicle navigates to the target location.

Provided that the reference fire status and the verification fire status correspond at least sufficiently, the central unit determines the verified reference fire status. The verified reference fire status can thereby correspond to a fire, a fire precursor and/or a smoldering fire or can represent the fire, the fire precursor and/or the smoldering fire, respectively. The verified reference fire status thus provides reliable information about whether a fire, a fire precursor or a smoldering fire prevails in the fire detector monitoring area. Follow-up actions, such as, for example, the extinguishing of a fire, a fire precursor and/or a smoldering fire can be initiated in the fire detector monitoring area on the basis of the verified reference fire status. A false alarm, in particular to a fire department, and/or a faulty initiation of an extinguishing process can thus be prevented effectively or reduced at least significantly. In particular property damages, which are triggered by a faulty alarm, can thus be reduced accordingly or even avoided.

The system furthermore provides the advantage that sensor data is not transmitted to the central unit, but only signals, which represent fire statuses, so that a quick and particularly simple signal connection between the central unit and the vehicle as well as between the central unit and the at least one fire detector are sufficient to determine the verified reference fire status. This is particularly advantageous in particular when the fire detector monitoring area is far away from the central unit. This is so, because a radio signal connection comprising a large range between the central unit and the vehicle can be provided in this case. Oftentimes, a data transmission rate is lower, the larger a range of a radio connection. A correspondingly small data transmission rate can thus be created when the vehicle is at the target location, thus at least in the vicinity of the fire detector monitoring area. This, however, is not or hardly disadvantageous for the system. This is so, because only a very small amount of data, in a simple case only a few bit, is required for transmitting the verification signal, which represents a verification status. A radio infrastructure covering a large area for transmitting large amounts of data, which can, for example, accumulate in response to a transmission of sensor data, can effectively be forgone.

The already mentioned, second embodiment alternative can furthermore or alternatively be provided for the system. The second embodiment alternative, however, is preferably an alternative embodiment alternative for the above-described, first embodiment alternative of the system. It can generally be provided, however, that the system is designed in such a way that both embodiment alternatives are provided for the system.

According to the second embodiment alternative of the system, it is provided that the instruction signal furthermore represents the reference fire status, the vehicle is configured for determining the reference fire status as verified reference fire status, in the event that the reference fire status and the verification fire status correspond at least sufficiently, and the vehicle is designed for transmitting the verification signal, which represents the verified reference fire status, to the central unit. The instruction signal can thus represent at least the target location and the reference fire status. The information about the reference fire status and the target location is thus provided to the vehicle. The vehicle can thereby be designed and/or configured for evaluating the reference fire status and the verification fire status. For this purpose, the vehicle can have a correspondingly designed and/or configured evaluation unit. The vehicle and/or the evaluation unit can in particular be configured for the evaluation in order to determine whether the reference fire status and the verification fire status correspond at least sufficiently. With regard to the sufficient correspondence, reference is made analogously to the explanations relating to the first embodiment alternative of the system. If the sufficient correspondence exists, the vehicle and/or the evaluation unit determines the verified reference fire status. With regard to the verified reference fire status, reference is also made analogously to the corresponding, preceding explanations. The vehicle is furthermore designed for transmitting the verification signal to the central unit. However, the verification signal represents the verified fire status and not the verification fire status in this case. With regard to the designs of the vehicle and of the central unit for transmitting the verification signal, reference is made analogously to the corresponding explanations relating to the first embodiment alternative of the system. This applies in particular for the corresponding signal sending unit and/or signal receiving unit. The explained advantages and/or effects, as they have been explained with regard to the first embodiment alternative, furthermore apply analogously for the second embodiment alternative of the system. This is so, because the verification signal also serves for the transmission of a status in this case, namely of the verified reference fire status, so that a quick and simple transmission from the vehicle to the central unit can be ensured.

In that the central unit determines the verified reference fire status and/or the information about the verified reference fire status is made available to the central unit, the central unit can now initiate follow-up actions, such as, for example, the initiation of an extinguishing process of a fire in the fire detector monitoring area.

In summary, it should once again be pointed out that a particular advantage of the system results from the decentralized determination of two independent fire statuses for the fire detector monitoring area. This is so, because on the one hand, the fire detector is designed for capturing a reference fire parameter of the fire detector monitoring are and for determining the reference fire status and transmitting it to the central unit on the basis of this. On the other hand, the vehicle is designed and/or configured for navigating to the target location, preferably in immediate vicinity to the fire detector monitoring area, in order to capture a further fire parameter, namely the verification fire parameter of the fire detector monitoring area from that location, and for determining the verification fire parameter on the basis of this. Two independent fire status parameters can thus be determined for the same fire detector monitoring area, namely in each case in a decentralized manner, namely from the fire detector on the one hand and from the vehicle on the other hand. This prevents that large amounts of sensor data needs to be transmitted from the fire detector or the vehicle, respectively, to the central unit, so as to then possibly performing a review at that location with regard to a possible fire in the fire detector monitoring area. Instead, the system allows that only the statuses, namely the reference fire status and the verification fire status, are transmitted to the central unit, so that the latter can determine the verified reference fire status in the case of a sufficient correspondence of the mentioned statuses. It is provided in the alternative that the reference fire status is also transmitted to the vehicle, so that the vehicle can determine the verified reference fire status in a decentralized manner, when a sufficient correspondence exists between the reference fire status and the verification fire status. Only a simple transmission of the verification fire status by means of the verification signal to the central unit is furthermore required in this case, so as to make the reliable information about a possible fire in the fire detector monitoring area available to said central unit.

The advantageous embodiments of the system described hereinafter refer to the system, which (also) has the features according to the first embodiment alternative and/or of the second embodiment alternative.

An advantageous embodiment of the system is characterized in that the vehicle and/or the central unit is or are designed, respectively, for determining an alarm signal on the basis of the verified reference fire status. As explained above, the verified reference fire status is determined only in the event that the reference fire status and the verification fire status correspond at least sufficiently, so that a conclusion can be drawn reliably from this for example to a fire in the fire detector monitoring area. The alarm signal can thus serve to initiate a possibly necessary follow-up action. A follow-up action can, for example, be an extinguishing of a fire in the fire detector monitoring area and/or a deactivation of a device in the fire detector monitoring area and/or in the immediate vicinity to the fire detector monitoring area. In the alternative or in addition, the alarm signal can be used to inform a further unit about the verified reference fire status. The vehicle and/or the central unit can thus be designed for sending the alarm signal to a further unit. A further unit can for example be an extinguishing control center and/or a control center. It can furthermore be provided in a preferable manner that the alarm signal, or a signal based on the alarm signal is output acoustically and/or optically, in particular from the vehicle and/or from the central unit. For this purpose, at least one corresponding output unit can be provided for the vehicle or the central unit, respectively. The alarm signal thus provides the advantage that a corresponding alarm, which suggests a fire, a fire precursor and/or a smoldering fire in the fire detector monitoring area, can be output acoustically and/or optically and/or further units can be informed about this and/or follow-up actions can be initiated. It can thus be ensured that a fighting of a fire is performed as quickly and promptly as possible.

A further advantageous embodiment of the system is characterized in that the vehicle and/or the central unit is or are designed, respectively, for determining a false alarm signal, which represents a faulty determination of the reference fire status and/or non-verified reference fire status, in the event that the reference fire status has been determined as non-verified reference fire status. The reference fire status is preferably not determined as verified reference fire status, when the reference fire status and the verification fire status do not correspond or do not correspond sufficiently. This can be the case, for example, when the reference fire status corresponds to a fire, whereas the verification fire status does not correspond to a fire, to a smoldering fire or to a possibly non-relevant fire precursor. In this case or in the cases, respectively, the verification fire status suggests that no fire, no smoldering fire or no relevant fire precursor, respectively, prevails in the fire detector monitoring area. This allows drawing the conclusion that the reference fire status can be determined in faulty manner. A verification of the reference fire status should thus not take place. The vehicle or the central unit, respectively, can determine the false alarm signal in this case. The false alarm signal thus provides the information that the reference fire status has been determined in a faulty manner or that the reference fire status could not be verified. It can thus be assumed that the fire detector has detected a fire, a fire precursor and/or a smoldering fire in a faulty manner, even though no actual fire, no relevant fire precursor and/or no relevant smoldering fire is present in the fire detector monitoring area. The false alarm signal can be output acoustically and/or optically, in particular by the vehicle and/or the central unit. For this purpose, a corresponding output unit for the vehicle and/or the central unit can be provided. A person, who monitors for example the central unit, is thus informed that a faulty determination of the reference fire status has occurred here. For example, no extinguishing action and/or no deactivation of devices in the fire detector monitoring area and/or in the immediate vicinity thereof can thus be initiated in this event. However, the false alarm signal can be transferred and/or transmitted to a further unit. For this purpose, the vehicle or the central unit, respectively, can have a corresponding signal sending unit, in particular radio signal sending unit. The false alarm signal can thus be sent, for example, to a control unit. The false alarm signal can be documented by the control center, in particular to possibly service the fire detector. This ensures a safe functioning of the system.

A further advantageous embodiment of the system is characterized in that the vehicle is designed as an aircraft, in particular a drone. If the vehicle is designed as an aircraft, the latter can overcome possible obstacles particularly easily and quickly, in order to reach the target location. This allows for a particularly prompt determination of the verification fire parameter or of the verification fire status, respectively, so that insight can be gained correspondingly quickly, whether or not the reference fire status is to be determined as verified reference fire status. Particularly preferably, the aircraft is designed as a drone or unmanned aircraft, respectively. The aircraft can navigate to the target location without human crew in this case. Personal injuries to a correspondingly non-existing crew can thus be ruled out. A reference fire status can thus be verified particularly securely. A particularly advantageous design of the aircraft is for example a multicopter, such as, for example, a quadrocopter or an octocopter. Such multicopters provide the advantage that they can hold and/or stand in any position in the room. This allows for a particularly simple navigation to the target location, so that the vehicle monitoring area and the fire detector monitoring area overlap sufficiently. In the alternative, the aircraft can also be formed by an airplane and/or a helicopter.

A further advantageous embodiment of the system is characterized in that the vehicle is designed as a land vehicle, in particular a robot vehicle. A land vehicle provides the advantage that it can be embodied to be particularly robust. In the event of a collision with an obstacle, this mostly does not necessarily lead to such a grave defect that the land vehicle cannot continue to drive or navigate, respectively. After a possible collision with an obstacle, the land vehicle can instead drive around said obstacle, in order to continue the further navigation to the target location. A robot vehicle has turned out to be particularly advantageous as a land vehicle. The robot vehicle preferably refers to an unmanned robot land vehicle. The land vehicle can drive and/or navigate without a human crew in this case. This allows for a particularly reliable capturing of the verification fire parameter, without personal injuries.

An advantageous embodiment of the system is characterized in that the vehicle sensor unit has a camera. The camera can thereby be designed as an optical camera for capturing an, in particular optical image. A light appearance, such as a fire and/or a flame, of a combustion process can thus be captured by means of the camera, wherein the camera is preferably designed for capturing a color temperature of the light appearance and/or a temperature of the light appearance as a fire parameter. It can furthermore be provided that the camera is designed as a thermal imaging camera for capturing a thermal image. The thermal imaging camera can thereby be designed for capturing infrared radiation. The camera can thus be designed for capturing a temperature, in particular a maximum temperature and/or an average temperature, wherein the captured temperature preferably forms the fire parameter. If the fire detector for the system is designed, for example, as a fire gas detector or as a smoke detector, the camera of the vehicle sensor unit can provide the advantage that the verification fire parameter is captured by a different measuring principle than the reference fire parameter. In other words, the fire detector sensor unit and the vehicle sensor unit can be based on different measuring principles, which allows for a particularly reliable verification of the reference fire status.

An advantageous embodiment of the system is characterized in that the vehicle at the target location is designed for determining a fire location by means of the vehicle sensor unit. The fire location is thereby preferably the location fire source of the fire, of the fire precursor and/or of the smoldering fire in the fire detector monitoring area. If a camera, which is designed for capturing an image, in particular an optical image and/or a thermal image, is used, for example, for the vehicle sensor unit, the vehicle can be designed for determining the fire location on the basis of the image. For this purpose, the vehicle can be designed for identifying that point in the image, which corresponds to the highest temperature, in particular an illustrated light appearance. Starting at the target location, the vehicle can be designed for determining the fire location on the basis of this identified point. It can furthermore be provided that the vehicle is designed for rotating and/or pivoting the vehicle sensor unit at the target location, in order to capture sensor data relating to different rotational and/or pivot positions by means of the vehicle sensor unit, wherein the fire location can be determined by means of the vehicle on the basis of the captured sensor data and the known target location. The vehicle can thus be designed, for example, for recording a plurality of images at different rotational and/or pivot positions of a camera of the vehicle sensor unit at the target location in order to determine the fire location by evaluating the images and in consideration of the target location.

An advantageous embodiment of the system is characterized in that the vehicle is configured for determining the fire location on the basis of a fire parameter captured at the target location. The vehicle can thus, for example, be configured for capturing a plurality of fire parameters by means of the vehicle sensor unit at the target location and/or in a predetermined surrounding area to the target location, and wherein the vehicle is configured for determining the fire location on the basis of the at least one captured fire parameter. If a plurality of fire parameters is now captured, the vehicle can, for example, be configured for selecting the largest and/or smallest fire parameter, and for determining the fire location on the basis of this selected fire parameter as well as on the basis of the location, in particular target location, at which the selected fire parameter has been captured. If, for example, a line scan camera is used as camera for the vehicle sensor unit, a corresponding image, which is captured by the line scan camera, can be used for determining the fire location, and thus for determining the fire source. For example the direction to the fire location can be determined from the image, which is captured by means of the line scan camera, in that the captured image is scanned for the highest color temperature. The vehicle and/or the vehicle sensor unit can be designed accordingly for this purpose.

An advantageous embodiment of the system is characterized in that the vehicle is designed for aligning the vehicle sensor unit in the direction of the fire location. If a fire parameter is now determined by means of the vehicle sensor unit, said fire parameter corresponds to the fire source in the fire detector monitoring area or in the vehicle monitoring area, respectively. A corresponding fire parameter provides the advantage that it can provide information as to whether a fire, a fire precursor and/or a smoldering fire is present, in a particularly reliable manner.

An advantageous embodiment of the system is characterized in that the vehicle is configured and/or designed for capturing the verification parameter when the vehicle sensor unit is aligned in the direction of the fire location. The vehicle can thus be configured for capturing the fire parameter at the target location by means of the vehicle sensor unit as the verification parameter of the fire detector monitoring area only when the vehicle sensor unit is aligned in the direction of the fire location. The verification fire parameter can provide information in a particularly reliable manner in this case, whether a fire, a fire precursor and/or a smoldering fire exists. Resulting from this, the reference fire status can also be evaluated particularly reliably and can possibly be determined as verified reference fire status.

An advantageous embodiment of the system is characterized in that the vehicle has a rotatable and/or pivotable aligning device, to which the vehicle sensor unit is fastened, wherein the vehicle is designed for controlling the aligning device, in order to align the vehicle sensor unit. The vehicle sensor unit can thus be rotated and/or pivoted by means of the aligning device, preferably for aligning the vehicle sensor unit in the direction of the fire location. The vehicle is thereby preferably designed and/or configured for controlling a rotating and/or pivoting of the aligning device. The aligning device preferably has a platform, to which the vehicle sensor unit is fastened. The platform of the aligning device can be designed so as to be rotatable and/or pivotable relative to the remaining vehicle. For this purpose, the aligning device can have a controllable actuator, by means of which the platform can be rotated and/or pivoted relative to the remaining vehicle. The actuator can be designed to be controllable by the vehicle, and the vehicle can be designed and/or configured for controlling the actuator, in order to attain an alignment of the vehicle sensor unit by means of a correspondingly controlled rotating and/or pivoting of the platform. For this purpose, the vehicle for controlling the aligning device can preferably be designed and/or configured for bringing the vehicle monitoring area in, in particular sufficient, overlap with the fire detector monitoring area, when the vehicle is at the target location. When the vehicle is at the target location, it is thus possibly by means of the rotatable and/or pivotable aligning device to align the vehicle sensor unit in such a way that the vehicle sensor monitoring area is in, in particular sufficient, overlap with the fire detector monitoring area. A rotation of the vehicle is thus not necessarily required in order to attain the desired overlap. This can instead be ensured by means of the aligning device or at least by using the aligning device.

An advantageous embodiment of the system is characterized in that the vehicle is designed in such a way that the vehicle, when it is at the target location, is rotated, until the vehicle monitoring area is in, in particular sufficient overlap, with the fire detector monitoring area. It can furthermore be provided that the corresponding overlap is already attained by the navigation of the vehicle to the target location.

An advantageous embodiment of the system is characterized in that the vehicle is designed as an autonomous vehicle for the independent navigation to the target location. The vehicle can thus independently navigate to the target location without receiving further control commands and/or navigation control commands. A continuous or ongoing sending of control commands is thus not required to attain a navigation of the vehicle to the target location. Instead, it is sufficient in this case that the vehicle receives the instruction signal, which represents at least the target location. The vehicle is preferably designed for independently navigating to the target location on the basis of the instruction signal.

An advantageous embodiment of the system is characterized in that the vehicle has a navigation control unit, which is designed for navigating the vehicle to the target location in a controlled manner on the basis of the instruction signal, in particular on the basis of the target location. The desired target location is reported to the vehicle and in particular to the navigation control unit by means of the received instruction signal. The instruction signal can simultaneously serve as command for starting the navigation to the target location and/or can be evaluated accordingly by the vehicle and/or the navigation unit. The navigation control unit can furthermore be designed for receiving signals from a navigation satellite and/or from a pseudolite. The navigation control unit is designed for the controlled navigation of the vehicle on the basis of these signals and the instruction signal, which represents at least the target location. The vehicle can thus preferably navigate independently to the target location after receipt of the instruction signal.

An advantageous embodiment of the system is characterized in that navigation data, which represents a map comprising possible routes, is stored by the vehicle, in particular by the navigation control unit, wherein the navigation control unit is designed for navigating the vehicle by using the navigation data. If the vehicle, in particular the navigation control unit, receives the instruction signal, which represents the target location, the navigation control unit can navigate the vehicle to the target location in a controlled manner by using the navigation data.

A further advantageous embodiment of the system is characterized in that the navigation control unit is designed for navigating the vehicle to the target location by using the navigation data. If the vehicle is used, for example, on factory premises, the navigation data can represent possible routes on the factory premises, along which the vehicle can navigate, in particular without collision, in particular to reach the target location. A possible collision of the vehicle with buildings and/or other stationarily placed objects is thus prevented effectively.

A further advantageous embodiment of the system is characterized in that the vehicle has an obstacle sensor, which is designed for detecting an obstacle, in particular in driving direction in front of the vehicle. A signal provided by the obstacle sensor can be transmitted to the navigation control unit, so that the navigation control unit is designed for navigating the vehicle to the target location in a controlled manner, preferably also by using the signal of the obstacle sensor. The vehicle can thus evade possible obstacles, which are in particular only present temporarily, in a particularly effective manner.

A further advantageous embodiment of the system is characterized in that the central unit is designed for sending control signals to the vehicle, in order to at least partially co-navigate the vehicle to the target location. The control signals received by the vehicle can be transmitted to the navigation control unit, so that the navigation control unit is designed for the controlled navigation of the vehicle to the target location on the basis of the control signals and/or at least also by using the control signals. The navigation control unit of the vehicle can thus be designed for the controlled navigation of the vehicle to the target location, for example by using the navigation data, the instruction signal, and the control signals received from the central unit. For example, possible obstacles and/or barriers can be reported to the vehicle by means of the control signals, so that the vehicle or the navigation control unit, respectively, navigates to the target location on an alternative route in consideration of these control signals.

An advantageous embodiment of the system is characterized in that the system has a plurality of the stationary fire detectors. Each of the fire detectors can thereby be designed analogously to the fire detector, which has already been explained. In this context, reference is made analogously to the explanations relating to the fire detector, which has already been discussed, as well as to the advantages and/or effects resulting therefrom, for each of the fire detectors. The central unit can furthermore be configured and/or designed for receiving a fire detector signal sent by each fire detector. If the system has a plurality of the stationary fire detectors, larger areas and/or larger buildings can for example be monitored therewith. The fire detectors can thereby be arranged in such a way that the fire detector monitoring areas thereof directly adjoin one another and/or at least partially overlap.

An advantageous embodiment of the system is characterized in that the central unit is designed for determining the target location on the basis of a transmitted fire detector signal of a fire detector. If each of the fire detectors is connected to the central unit, for example, by means of a signal line connection, so as to be able to transmit a corresponding fire detector signal to the central unit in each case, the central unit can be designed, for example, for determining that fire detector, which has transmitted the fire detector signal. The central unit can now be designed for determining the target location on the basis of the determined fire detector. For this purpose, the central unit can store data, which represents a target location for each of the fire detectors, wherein the central unit is designed for determining the respective target location by using the mentioned data. If one of the fire detectors now transmits a fire detector signal to the central unit, the central unit can determine the target location, which is relevant for the respective fire detector, by means of the data.

A further advantageous embodiment of the system is characterized in that the central unit is designed for determining a fire detector location of the fire detector, which has transmitted the fire detector signal, on the basis of a transmitted fire detector signal of one of the fire detectors, and that the central unit is designed for determining the target location on the basis of the fire detector location. The fire detector signal transmitted by the fire detector can thereby furthermore have an identifier. The identifier can also be referred to as address or address identifier, in particular of a fire detector. The identifier can thereby provide information about the fire detector location. The central unit can be designed for determining the fire detector location on the basis of the identifier. In the alternative or in addition, the central unit can store data, each representing a plurality of identifiers, which the fire detectors can transmit to the central unit by means of the fire detector signal. If the fire detector now furthermore transmits an identifier to the central unit by means of the fire detector signal, the central unit can be designed for determining the fire detector location of the fire detector by using the mentioned data on the basis of the fire detector signal. The central unit can furthermore store data, which represents a corresponding target location for each fire detector location. In particular on the basis of this data, the central unit can thus be configured and/or designed for determining a corresponding target location, which is then used to transmit an instruction signal to the vehicle, on the basis of the determined fire detector location, so that said vehicle can navigate to the corresponding target location.

In the alternative, the data for determining the target location and/or the fire detector location mentioned beforehand by the central unit can also be stored by a different unit and/or a different system, wherein the central unit has a communication connection to the corresponding unit or the corresponding system, respectively, and wherein the central unit is designed for requesting the corresponding data from the mentioned unit or the mentioned system, respectively, so as to then carry out the corresponding determination of the target location or of the fire detector location, respectively.

A further advantageous embodiment of the system is characterized in that the central unit is configured for determining the instruction signal in such a way that the instruction signal represents at least one target location for the vehicle, at which, when the vehicle is at the target location, the vehicle monitoring area is in sufficient overlap with the fire detector monitoring area, the reference fire parameter of which has been captured by the fire detector sensor unit of the fire detector, which has transmitted the fire detector signal to the central unit. If, for example, one of the fire detectors now captures a reference fire parameter and if a fire detector signal is transmitted to the central unit on the basis of this, the central unit determines the instruction signal in such a way that the target location for the vehicle, which is represented by the instruction signal, is selected in such a way that the vehicle monitoring area is in sufficient overlap with the fire detector monitoring area, when the vehicle is at the target location. The central unit is thus configured for determining a corresponding target location or a corresponding instruction signal, respectively, for each of the fire detectors, so that the vehicle, when it receives this instruction signal, can navigate to the corresponding target location, in order to attain an overlap of the vehicle monitoring area with the corresponding fire detector monitoring area. This embodiment of the system provides the advantage that a plurality of stationary fire detectors can be provided and that the vehicle can navigate to a respectively adapted target location by means of the instruction signal, in order to attain the overlap between the vehicle monitoring area and the fire detector monitoring area, which belongs to the fire detector. A plurality of vehicles can thus be forgone. Instead, only one vehicle is sufficient for a determination of a verified reference fire status, even in the case of a plurality of fire detectors. This is why the system can be designed in a particularly cost-efficient manner even in the case of a plurality of fire detectors and can nonetheless provide the opportunity to review a reference fire status and to possibly determine a verified reference fire status.

A further advantageous embodiment of the system is characterized in that the central unit and the vehicle are connected to one another by means of a wireless signal connection. The wireless signal connection can be used for transmitting the instruction signal from the central unit to the vehicle and/or for transmitting the verification signal from the vehicle to the central unit. For this purpose, the central unit and the vehicle can each have a communication unit, which is designed for the wireless sending and/or receiving of a signal.

A further advantageous embodiment of the system is characterized in that a measuring principle of the fire detector sensor unit or of the fire detector sensor units, respectively, and a measuring principle of the vehicle sensor unit are different. The measuring principle of the preferable plurality of fire detector sensor units can thereby be identical. In one example, the sensor type used for a vehicle sensor unit can be designed in another way or differently from a sensor type, respectively, for the at least one fire detector sensor unit. In that different measuring principles are used for the vehicle sensor unit and the at least one fire detector sensor unit, measuring principle-related faulty measurements and corresponding errors in response to the determination, in particular of the verified reference fire status, can be prevented or at least reduced.

A further advantageous embodiment of the system is characterized in that the vehicle sensor unit has a plurality of sensors, each comprising different measuring principles. The same can apply for each of the fire detector sensor units. Each of the fire detector sensor units can thus have a plurality of sensors, each comprising different measuring principles. In that a plurality of sensors is provided for each of the mentioned sensor units, faulty measuring principle-related measurements from each of the sensor units can already be prevented, so that a fire parameter or a reference fire parameter, respectively, can be captured particularly reliably.

A further advantageous embodiment of the system is characterized in that the system has an extinguishing control center, wherein the central unit is designed for transmitting the alarm signal to the extinguishing control center, and wherein the extinguishing control center is designed for controlling an extinguishing installation on the basis of the transmitted alarm signal for extinguishing a fire in the fire detector monitoring area, the reference fire parameter of which has been captured by the fire detector sensor unit of the fire detector, which has transmitted the fire detector signal to the control unit. If the verified reference fire status is thus now determined by the central unit or is transmitted from the vehicle to the central unit by means of the instruction signal, the alarm signal can be determined by the central unit on the basis of this. The alarm signal thereby preferably represents the information that a follow-up action, for example an extinguishing, is to be initiated. If the alarm signal is now transmitted from the central unit to the extinguishing control center, the extinguishing control center can control an extinguishing installation on the basis of this. It is thereby preferably provided that the alarm signal also comprises the identifier and/or the fire detector location of the fire detector, which has transmitted the fire detector signal to the control unit. The central unit can be designed accordingly for this purpose. The information that a fire is to be extinguished and where this fire is to be extinguished can thus be made available to the extinguishing control center by transmitting the alarm signal. The extinguishing control center can thus also control an extinguishing installation accordingly, in order to output extinguishing agent in the fire detector monitoring area, for example by means of the extinguishing installation, so that a fire in the fire detector monitoring area is extinguished.

An advantageous embodiment of the system is characterized in that the central unit and the extinguishing control center are at least partially designed as a joint, functional unit. The central unit and the extinguishing control center can thus be designed to be particularly compact. The central unit is preferably formed by a fire detector control center.

The fire detector control center and the extinguishing control center can form a joint fire detector and extinguishing control center in this case.

According to a second aspect of the invention, the above-mentioned object is solved by an unmanned vehicle, which has: a vehicle sensor unit, which is designed for capturing a fire parameter of a vehicle monitoring area, a signal receiving unit for receiving an instruction signal, which represents at least one target location, in the case of which the vehicle monitoring area is in sufficient overlap with a fire detector monitoring area, when the vehicle is at the target location, and a navigation control unit, which is designed for independently navigating the vehicle to the target location on the basis of the received instruction signal, so that the vehicle monitoring area and the fire detector monitoring area overlap sufficiently, wherein the vehicle is configured for capturing the fire parameter by means of the vehicle sensor unit as a verification fire parameter of the fire detector monitoring area at the target location, wherein the vehicle is designed for determining a verification fire status by evaluating the verification fire parameter, and wherein the instruction signal furthermore represents a reference fire parameter of the fire detector monitoring area, the vehicle is configured for determining the reference fire status as verified reference fire status, in the event that the reference fire status and the verification fire status correspond at least sufficiently, and the vehicle is designed for transmitting a verification signal, which represents the verified reference fire status, to a central unit. With regard to the unmanned vehicle according to the second aspect of the invention, reference is made analogously to the explanations, preferred features, advantages and/or effects, which have been discussed for the vehicle according to the first aspect of the invention.

According to a further aspect of the invention, the above-mentioned object is solved by an unmanned vehicle, which has: a vehicle sensor unit, which is designed for capturing a fire parameter of a vehicle monitoring area, a signal receiving unit for receiving an instruction signal, which represents at least one target location, in the case of which the vehicle monitoring area is in sufficient overlap with a fire detector monitoring area, when the vehicle is at the target location, and a navigation control unit, which is designed for independently navigating the vehicle to the target location on the basis of the received instruction signal, so that the vehicle monitoring area and the fire detector monitoring area overlap sufficiently, wherein the vehicle is configured for capturing the fire parameter by means of the vehicle sensor unit as a verification fire parameter at the target location, wherein the vehicle is designed for determining a verification fire status by evaluating the verification fire parameter, and wherein the vehicle is either designed for transmitting a verification signal, which represents the verification fire status, to a central unit. With regard to the unmanned vehicle according to this aspect of the invention, reference is made analogously to the explanations, preferred features, advantages and/or effects, which have been discussed for the vehicle according to the first aspect of the invention.

An advantageous embodiment of the vehicle according to the second aspect of the invention is preferably characterized in that the signal receiving unit is designed for receiving a signal, in particular the instruction signal, from the central unit. For the features of this embodiment, reference is made analogously to the explanations, preferred features, advantages and/or effects, which have been discussed for corresponding features for the vehicle according to the first aspect of the invention.

According to a third aspect of the invention, the above-mentioned object is solved by a central unit, which is characterized in that the central unit is designed for receiving a fire detector signal of a fire detector, the central unit is configured for transmitting an instruction signal to a vehicle, in the event that a fire detector signal received from the fire detector represents a reference fire status, which needs to be verified, wherein the instruction signal represents at least one target location for the vehicle, wherein a vehicle monitoring area of a vehicle sensor unit of the vehicle is in sufficient overlap with a fire detector monitoring area of the fire detector, when the vehicle is at the target location, so that the vehicle can capture a verification fire parameter of the fire detector monitoring area by means of the vehicle sensor unit, wherein the central unit is designed for receiving a verification signal, which represents a verification fire status corresponding to the verification fire parameter, from the vehicle, and wherein the central unit is configured for determining the reference fire status as verified reference fire status, in the event that the reference fire status and the verification fire status correspond at least sufficiently. With regard to the central unit according to the third aspect of the invention, reference is preferably made analogously to the explanations, preferred features, advantages and/or effects, which have been discussed for the central unit according to the first aspect of the invention.

According to a fourth aspect of the invention, the above-mentioned object is solved by a method. The method serves for determining a verified fire status. The method has the following steps:

a) capturing, in particular at least one reference fire parameter of a fire detector monitoring area by means of a fire detector sensor unit of a fire detector;

b) determining a reference fire status by evaluating the, in particular at least one reference fire parameter by means of the fire detector;

c) transmitting a fire detector signal, which represents the reference fire status, from the fire detector to a central unit;

d) transmitting an instruction signal from the central unit to a vehicle, in the event that the fire detector signal transmitted by the fire detector represents a reference fire status, which needs to be verified, wherein the vehicle has a vehicle sensor unit, which is designed for capturing, in particular at least one fire parameter of a vehicle monitoring area, and wherein the instruction signal represents at least one target location for the vehicle, wherein the vehicle monitoring area is in sufficient overlap with the fire detector monitoring area, when the vehicle is at the target location;

e) navigating the vehicle, namely preferably independently, to the target location on the basis of the transmitted instruction signal by means of a navigation control unit of the vehicle, so that the vehicle monitoring area and the fire detector monitoring area overlap sufficiently;

f) capturing the or each fire parameter as a verification fire parameter of the fire detector monitoring area by means of the vehicle sensor unit; and g) determining a verification fire status by evaluating the, in particular at least one, verification fire parameter by means of the vehicle;

h1) transmitting a verification signal, which represents the verification fire status, from the vehicle to the central unit; and i1) determining the reference fire status as verified reference fire status by means of the central unit, in the event that the reference fire status and the verification fire status correspond at least sufficiently.

With regard to the method according to the fourth aspect of the invention, reference is made analogously to the explanations, preferred features, advantages and/or effects, which have been discussed accordingly for the system according to the first aspect of the invention.

According to a fifth aspect of the invention, the above-mentioned object is solved by a method. The method serves for determining a verified fire status. The method has the following steps:

h) capturing, in particular at least one reference fire parameter of a fire detector monitoring area by means of a fire detector sensor unit of a fire detector;
i) determining a reference fire status by evaluating the, in particular at least one, reference fire parameter by means of the fire detector;
j) transmitting a fire detector signal, which represents the reference fire status, from the fire detector to a central unit;
k) transmitting an instruction signal from the central unit to a vehicle, in the event that the fire detector signal transmitted by the fire detector represents a reference fire status, which needs to be verified, wherein the vehicle has a vehicle sensor unit, which is designed for capturing, in particular at least one fire parameter of a vehicle monitoring area, and wherein the instruction signal represents at least one target location for the vehicle, wherein the vehicle monitoring area is in sufficient overlap with the fire detector monitoring area, when the vehicle is at the target location;
l) navigating the vehicle, namely preferably independently, to the target location on the basis of the transmitted instruction signal by means of a navigation control unit of the vehicle, so that the vehicle monitoring area and the fire detector monitoring area overlap sufficiently;
m) capturing the or each fire parameter as a verification fire parameter of the fire detector monitoring area by means of the vehicle sensor unit; and
n) determining a verification fire status by evaluating the, in particular at least one, verification fire parameter by means of the vehicle;
h2) determining the reference fire status as verified reference fire status by means of the vehicle, in the event that the reference fire status and the verification fire status correspond at least sufficiently, wherein the instruction signal furthermore represents the reference fire status; and
i2) transmitting a verification signal, which represents the verified reference fire status, to the central unit.

With regard to the method according to the fifth aspect of the invention, reference is preferably made analogously to the explanations, preferred features, advantages and/or effects, which have been discussed accordingly for the system according to the first aspect of the invention.

The following preferred embodiments of the method each form a preferred embodiment of the method according to the fourth aspect of the invention and/or a preferred embodiment of the method according to the fifth aspect of the invention. At this point, reference is preferably already made analogously to the explanations, preferred features, advantages and/or effects, which have been discussed accordingly for the system according to the first aspect of the invention.

An advantageous embodiment is characterized by the following further step: determining an alarm signal by means of the vehicle or by means of the central unit, respectively, wherein the alarm signal represents the verified reference fire status, in the event that the reference fire status has been determined as verified reference fire status.

A further advantageous embodiment is characterized by the following further step: determining a false alarm signal by means of the vehicle or the central unit, respectively, wherein the false alarm signal represents a faulty determination of a reference fire status and/or a non-verified reference fire status, in the event that the reference fire status has not been determined as verified reference fire status.

A further advantageous embodiment is characterized by the following further step: determining a fire location by means of the vehicle sensor unit of the vehicle, when the vehicle is at the target location.

A further advantageous embodiment is characterized by the following further step: aligning the vehicle sensor unit in the direction of the fire location.

A further advantageous embodiment of the method is characterized in that the vehicle has a rotationally and/or pivotable aligning device, to which the vehicle sensor unit is fastened, and the method is characterized by an aligning of the vehicle sensor unit by means of the aligning device, preferably in the direction of the fire location.

A further advantageous embodiment of the method is characterized in that the verification parameter is captured when the vehicle sensor unit is aligned in the direction of the fire location.

A further advantageous embodiment is characterized in that navigation data, which represents a map comprising possible routes, is stored by the vehicle, in particular the navigation control unit, and wherein the method is further characterized in that the navigation of the vehicle takes place by using the navigation data.

Further features, advantages and potential applications of the present invention follow from the following description of the exemplary embodiments and the figures. All described and/or depicted features alone and in any combination thereby form the subject matter of the invention, also independently of their composition in the individual claims or the dependencies thereof. The same references furthermore represent the same or similar objects in the figures.

Figure 1:
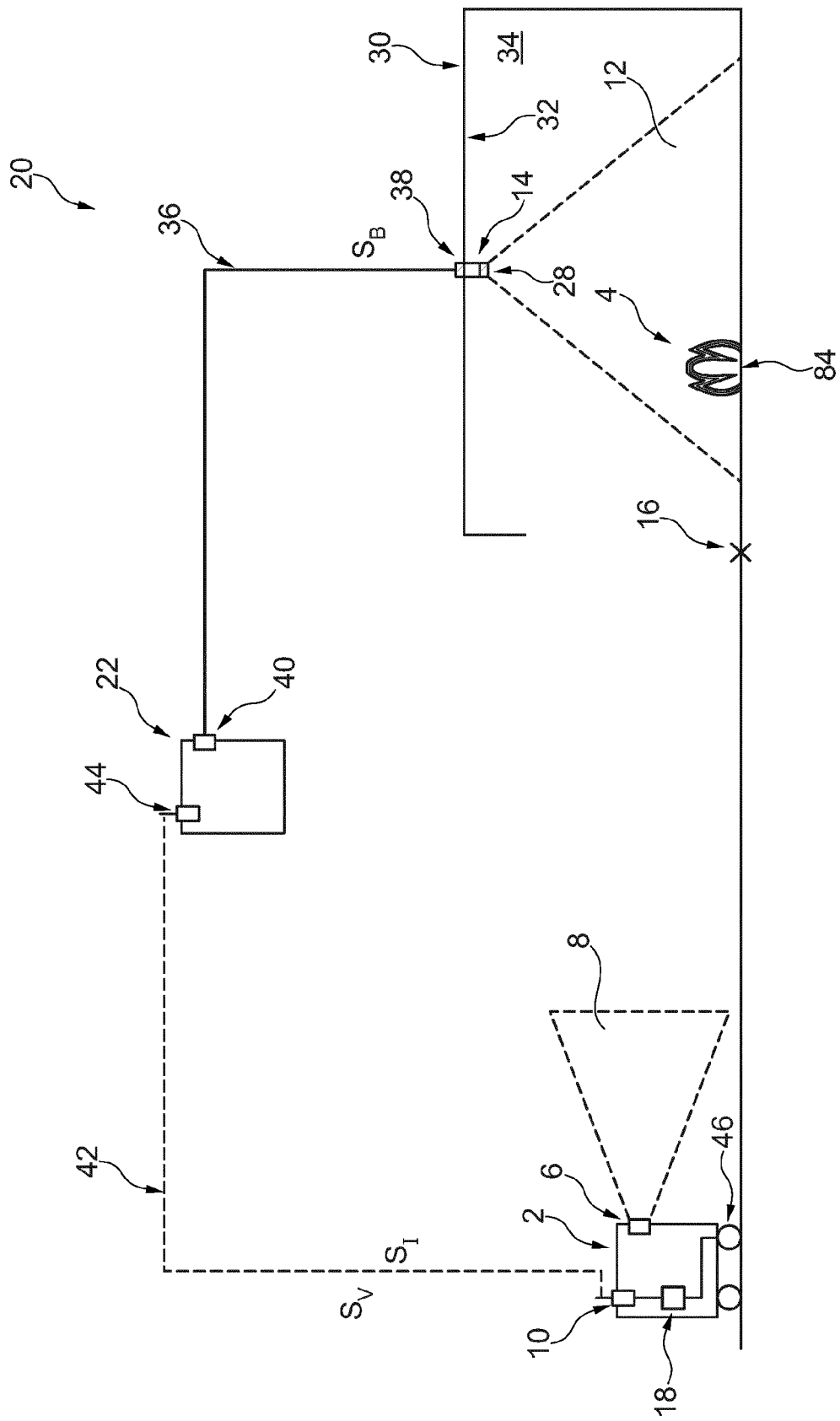
FIG. 1 shows a first embodiment of the system in a schematic illustration.

A system 20 for determining a verified reference fire status $Z_{VR}$ is illustrated schematically in FIG. 1. The system 20 comprises a stationary fire detector 14. The stationary fire detector 14 can be installed, for example, in a building 30. As can be seen from FIG. 1, the fire detector 14 is attached, for example, to a ceiling 32 of a room 34 of the building 30 for this purpose. For this purpose, the fire detector 14 can be designed, for example, as a combustion gas detector, a smoke detector or as a flame detector. Further embodiments of the fire detector 14 are known from the prior art and also form possible embodiments for the fire detector 14. In that the fire detector 14 is fixedly fastened to the ceiling 32 of the building 30, the fire detector 14 is designed to be immovable and thus as stationary fire detector 14.

The fire detector 14 monitors a part of the room 34, namely the fire detector monitoring area 12. The fire detector monitoring area 12 can thus be assigned to the fire detector 14. The fire detector 14 serves for detecting a fire, a fire precursor and/or a smoldering fire. To make this possible, the fire detector 14 has a sensor unit, which is referred to as fire detector sensor unit 28. The fire detector sensor unit 28 is designed for capturing a reference fire parameter $K_R$ of the fire detector monitoring area 12. If the fire detector 14 is designed, for example, as combustion gas detector, the corresponding fire detector sensor unit 28 can be designed for capturing a smoke concentration and/or for capturing a concentration of at least one predetermined gas. The predetermined gas thereby be a gas, in particular $CO_2$ and/or CO, which is created in response to a combustion. In this case, the reference parameter $K_R$, which can be detected by the fire detector sensor unit 28, forms the smoke concentration or the concentration of the predetermined gas, respectively. A capturing can generally refer to a direct or indirect capturing.

The fire detector 14 is furthermore designed for determining a reference fire status $Z_R$ by evaluating the reference fire parameter $K_R$. For this purpose, the fire detector 14 can have an evaluation unit. The evaluation unit is preferably designed for evaluating the reference fire parameter $K_R$. The evaluation unit is furthermore preferably designed for determining the reference fire status $Z_R$ on the basis of the result of the evaluation. A reference fire status $Z_R$ represents, for example, a fire, a fire precursor and/or a smoldering fire. In the case of a fire, a fire precursor and/or a smoldering fire, characteristic gases, such as CO, are often created, which can be measured, for example, by the fire detector sensor unit 28. A fire is preferably understood to be a combustion process, which is associated with a light appearance. A combustion process without light appearance is preferably understood to be a smoldering fire.

Figure 14:
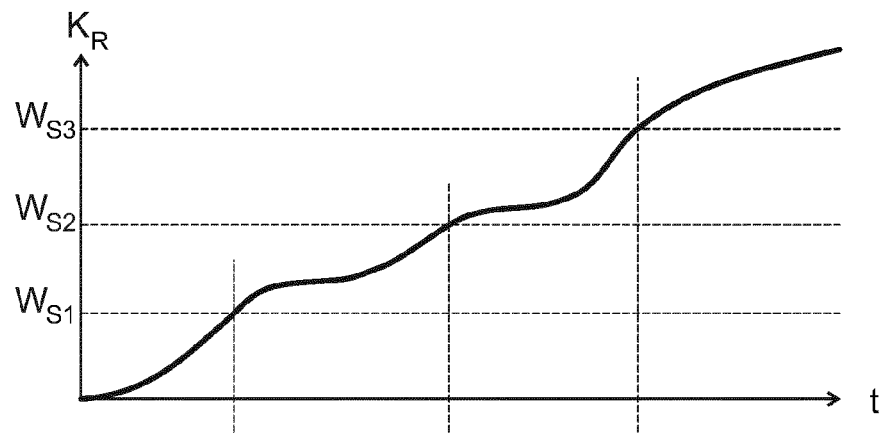
FIG. 14 shows a temporal sequence of the reference fire status in a schematic illustration.
Figure 15:
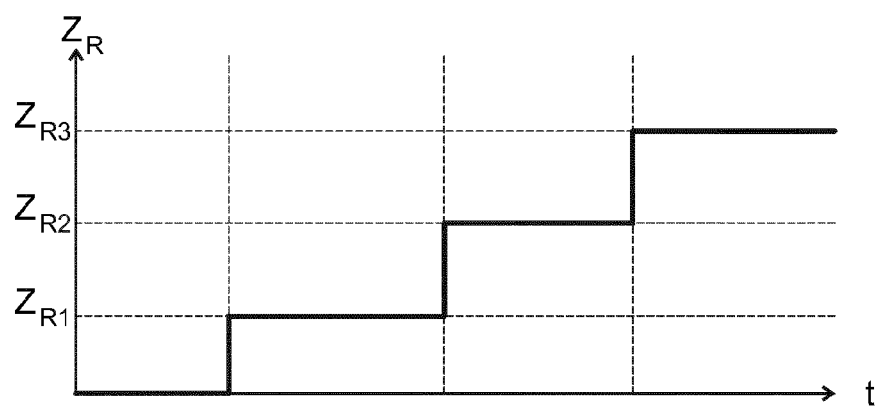
FIG. 15 shows a temporal sequence of the reference fire status in a schematic illustration.

An exemplary value course of the reference fire parameter $K_R$ over the time t is illustrated schematically in FIG. 14. The fire detector 14, and preferably the corresponding evaluating unit, can store at least one threshold value $W_{S1}$, preferably a plurality of threshold values $W_{S1}$, $W_{S2}$, $W_{S3}$. These threshold values $W_{S1}$, $W_{S2}$, $W_{S3}$ can be threshold values for the reference fire parameter $K_R$, thus preferably for a gas concentration, which is measured by the fire detector sensor unit 28. If a reference fire parameter $K_R$, which is captured by means of the fire detector sensor unit 28, thus in particular a corresponding smoke concentration, exceeds a first of the threshold values $W_{S1}$, this can for example be characteristic for a smoldering fire. An exemplary condition course of the reference fire status $Z_R$ over the time t and corresponding to the value course of the reference fire parameter $K_R$ from FIG. 14 is illustrated schematically in FIG. 15. If the captured reference fire parameter $K_R$ reaches and/or exceeds the threshold value $W_{S1}$, a reference fire status $Z_{R1}$, which corresponds, for example, to a smoldering fire, can be determined on the basis of this. If, for example, a higher reference fire parameter $K_R$, thus in particular a higher smoke concentration, is captured, the reference fire parameter $K_R$ or the smoke concentration, respectively, can reach and/or exceed a further one of the threshold values $W_{S2}$, so that this can be characteristic for a fire precursor and a corresponding reference fire status $Z_{R2}$ can be determined. If the captured reference fire parameter $K_R$ reaches and/or exceeds the further threshold value $W_{S3}$, a reference fire status $Z_{R3}$, which corresponds, for example, to a fire 4, can be determined on the basis of this. It is thus preferably provided that the evaluation unit of the fire detector 14 is designed for determining a reference fire status $Z_R$ on the basis of the captured reference fire parameter $K_R$, and preferably by using at least one threshold value $W_{S1}$, $W_{S2}$, $W_{S3}$.

The system 20 furthermore has a central unit 22. The central unit 22 is preferably a part of a fire detector system (not illustrated), which can also be referred to as fire detector installation. In the alternative or in addition, the central unit 22 can be a fire detector control center or at least a part of a fire detector control center. It can furthermore be provided that the central unit 22 is and forms at least a part of a control center unit (not illustrated). Without limiting the general idea of the invention, it shall be assumed hereinafter purely in an exemplary manner that the central unit 22 is a fire detector control center. For the sake of completeness, it shall be pointed out that the central unit 22 as fire detector control center can at least partially be designed together with an extinguishing control center 64. This is so, because a fire detector control center and an extinguishing control center 64 can, for example, at least partially be designed as a joint unit.

The stationary fire detector 14 is connected to the central unit 22 by means of a signal line connection 36. A signal connection thus exists between the stationary fire detector 14 and the central unit 22. To transmit a signal from the stationary fire detector 14 to the central unit 22, the stationary fire detector 14 has a signal sending unit 38. The signal sending unit 38 of the fire detector 14 is connected to the signal line 36. The central unit 22 has a signal receiving unit 40. The signal receiving unit 40 of the central unit 22 is also connected to the signal line 36. The signal line 36 can thus extend from the signal sending unit 38 of the fire detector 14 to the signal receiving unit 40 of the central unit 22. A fire detector signal $S_B$ can thus be transmitted from the fire detector 14 to the central unit 22. The fire detector 14 is thus designed for transmitting the fire detector signal $S_B$, which represents the reference fire status $Z_R$, to the central unit 22. The reference fire status $Z_R$ or the information about it, respectively, can be made available to the central unit 22 by means of the transmission of the fire detector signal $S_B$ from the fire detector 14 to the central unit 22.

If a reference fire status $Z_R$, which corresponds to a fire, has been determined by means of the fire detector 14 and if a fire detector signal $S_B$, which represents the corresponding reference fire status $Z_R$, has been transmitted to the central unit 22 by means of the fire detector 14, it was often not unambiguously clear in the prior art, whether a fire 4 or possibly a fire precursor and/or a smoldering fire does in fact prevail in the fire detector monitoring area 12. This is so, because it can happen as a result of false variables and/or as a result of unforeseen circumstances that the fire detector 14 determines a reference fire status $Z_R$, which corresponds to a fire 4, even though a fire 4 does in fact not prevail in the fire detector monitoring area 12. The more frequently such false variables and/or unforeseen circumstances occur, which lead to the result explained before, the larger the risk for emergency personnel for extinguishing a fire 4 that a reference fire status $Z_R$, which corresponds to an actual fire 4, is not perceived and/or interpreted with the necessary seriousness. This harbors dangers, however, because property damages and/or personal injuries, which increase exponentially over time, can be prevented effectively in the fire detector monitoring area 12 of the room 34 only by means of a direct and prompt firefighting. A review and/or verification of the reference fire status $Z_R$, which is as prompt and early as possible, is thus very important. If a fire detector signal $S_B$, which represents the reference fire status $Z_R$, is thus transmitted from the fire detector 14 to the central unit 22, a person is in then in practice often sent to the fire detector 14 or to the fire detector monitoring area 12, respectively, to review, whether a fire 4 or fire precursor, respectively, and/or smoldering fire, which corresponds to the reference fire status $Z_R$, does in fact exist. The combustion process can further develop in the time between the transmission of the fire detector signal $S_B$ from the fire detector 14 to the central unit 22 and the arrival of the person in the room 34 or at the fire detector monitoring area 12, respectively. An actual fire 4 comprising light appearance can thus have been created, for example, from a smoldering fire. The risk of property damages and/or personal injuries rises accordingly. If the person has arrived to examine the fire detector monitoring area 12 for a possible fire or a fire precursor, respectively, and/or a smoldering fire, the person can give a corresponding response, so that the reference fire status $Z_R$ can be confirmed or not, as the case may be. Given the above-explained facts, it is provided according to the invention to propose a system 20, which is able to avoid a possible risk of property damages and/or personal injuries as much as possible or to at least reduce it.

The system 20 according to the invention is to thus serve for the in particular automatic determination of a verified reference fire status. For this purpose, the system 20 has the central unit 22, the stationary fire detector 14, as well as an unmanned vehicle 2. In this context, reference is made to the preceding explanations. The central unit 22 is furthermore configured for transmitting an instruction signal $S_I$ to the vehicle 2. The transmission of the instruction signal $S_I$, however, only takes place when the fire detector signal $S_B$, which is transmitted by the fire detector 14, represents a reference fire status $Z_R$, which needs to be verified. It can generally be provided that each reference fire status $Z_R$ needs to be verified. The instruction signal $S_I$ is transmitted to the vehicle 2 in this case, when the central unit 22 receives the fire detector signal $S_B$ from the fire detector 14. It can happen, however, that not each reference fire status $Z_R$ needs to be verified. If the reference fire status $Z_R$ corresponds, for example, to a fire precursor, it can be provided that a corresponding reference fire status $Z_R$ does not need to be verified.

The central unit 22 and the vehicle 2 are connected to one another by means of a signal connection 42. The signal connection 42 is preferably a radio signal connection. The central unit 22 thereby has a signal sending unit 44, which is preferably designed as a radio signal sending unit. The instruction signal $S_I$ can thus be sent to the vehicle 2 by means of the signal sending unit 44. For receiving the instruction signal $S_I$, the vehicle 2 has a signal receiving unit 10, which is preferably designed as a radio signal receiving unit. It is thereby not necessary that the instruction signal $S_I$ is transmitted directly from the signal sending unit 44 of the central unit 22 to the signal receiving unit 10 of the vehicle 2. For example at least one transmitter (not illustrated) can thus be provided, which is designed for the signal forwarding and which serves the purpose of forwarding the instruction signal $S_I$ from the central unit 22 or the corresponding signal sending unit 44, respectively, to the signal receiving unit 10 of the vehicle 2.

The vehicle 2 has a sensor unit, which is referred to as vehicle sensor unit 6. The vehicle sensor unit 6 is designed for capturing a fire parameter $K_F$ of a vehicle monitoring area 8. For the fire parameter $K_F$, reference is made analogously to the preceding explanations relating to the reference fire parameter $K_R$. The vehicle sensor unit 6, however, serves the purpose of capturing the fire parameter $K_F$ of the vehicle monitoring area 8 in this case. The vehicle monitoring area 8 can thus be assigned to the vehicle sensor unit 6. In other words, the vehicle monitoring area 8 can be assigned to the vehicle sensor unit 6 in a stationary manner. If the vehicle 2 and/or the vehicle sensor unit 6 is moved, a corresponding movement of the vehicle monitoring area 8 takes place. It can thus be captured by means of the vehicle sensor unit 6, whether a fire 4, a fire precursor and/or a smoldering fire exists in the vehicle monitoring area 8.

Figure 7:
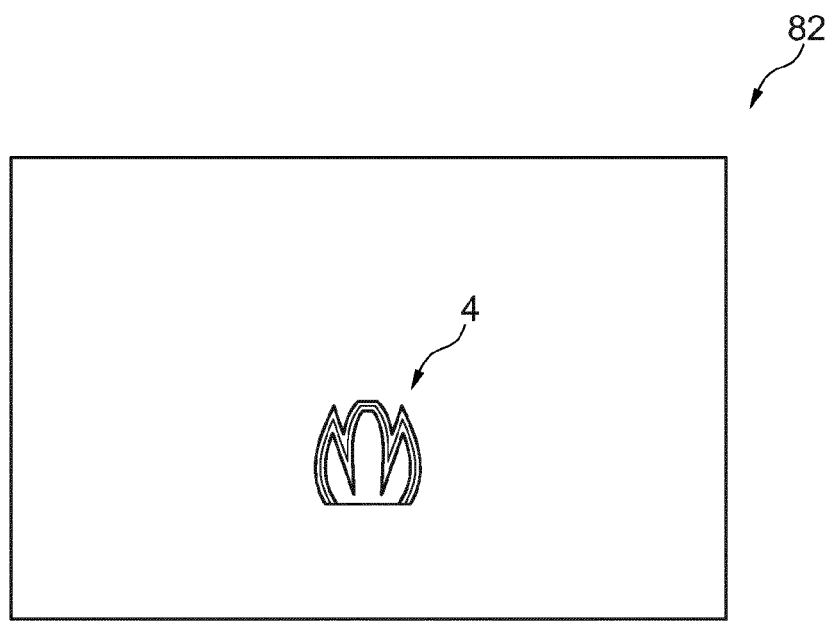
FIG. 7 shows a schematic illustration of an image.

It turned out to be advantageous when the vehicle sensor unit 6 has and/or is a camera, in particular a thermal imaging camera. The camera can thereby be designed for capturing an image 82 of the vehicle monitoring area 8, as it is illustrated schematically, for example, in FIG. 7. Provided that the camera is designed as thermal imaging camera, the thermal imaging camera can be designed for capturing a thermal image of the vehicle monitoring area 8. The vehicle sensor unit 6 can furthermore be designed for evaluating the corresponding image or thermal image, respectively, and for capturing the fire parameter $K_F$ of the vehicle monitoring area 8 on the basis of this.

If the vehicle sensor unit 6 is designed, for example, with a thermal imaging camera, the vehicle sensor unit 6 can be designed for capturing a temperature, in particular for capturing an average temperature and/or a maximum temperature. The temperature, in particular the average and/or maximum temperature, forms the fire parameter $K_F$ in this case, which can be captured by the vehicle sensor unit 6.

It is to be reviewed by means of the vehicle 2, whether a fire 4 or a fire precursor and/or a smoldering fire does in fact prevail in the fire detector monitoring area 12. The instruction signal $S_I$ transmitted from the central unit 22 to the vehicle 2 thus represents at least one target location 16 for the vehicle 2. The target location 16 can thus be transmitted to the vehicle 2 by means of the instruction signal $S_I$. The vehicle 2 is thereby configured and/or designed for navigating to the corresponding target location 16 on the basis of the instruction signal $S_I$ or the target location 16, which is represented by the instruction signal $S_I$, respectively. Navigating is to preferably refer to driving, flying and/or moving in this sense. It turned out to be advantageous hereby when the vehicle 2 is designed for independently navigating to the target location 16 on the basis of the instruction signal $S_I$. For this purpose, the vehicle 2 can have a navigation control unit 18, which is configured for evaluating the instruction signal $S_I$ as well as for controlling the vehicle 2 on the basis of the instruction signal $S_I$ for navigating the vehicle 2 to the target location 16 in a controlled manner.

Figure 2:
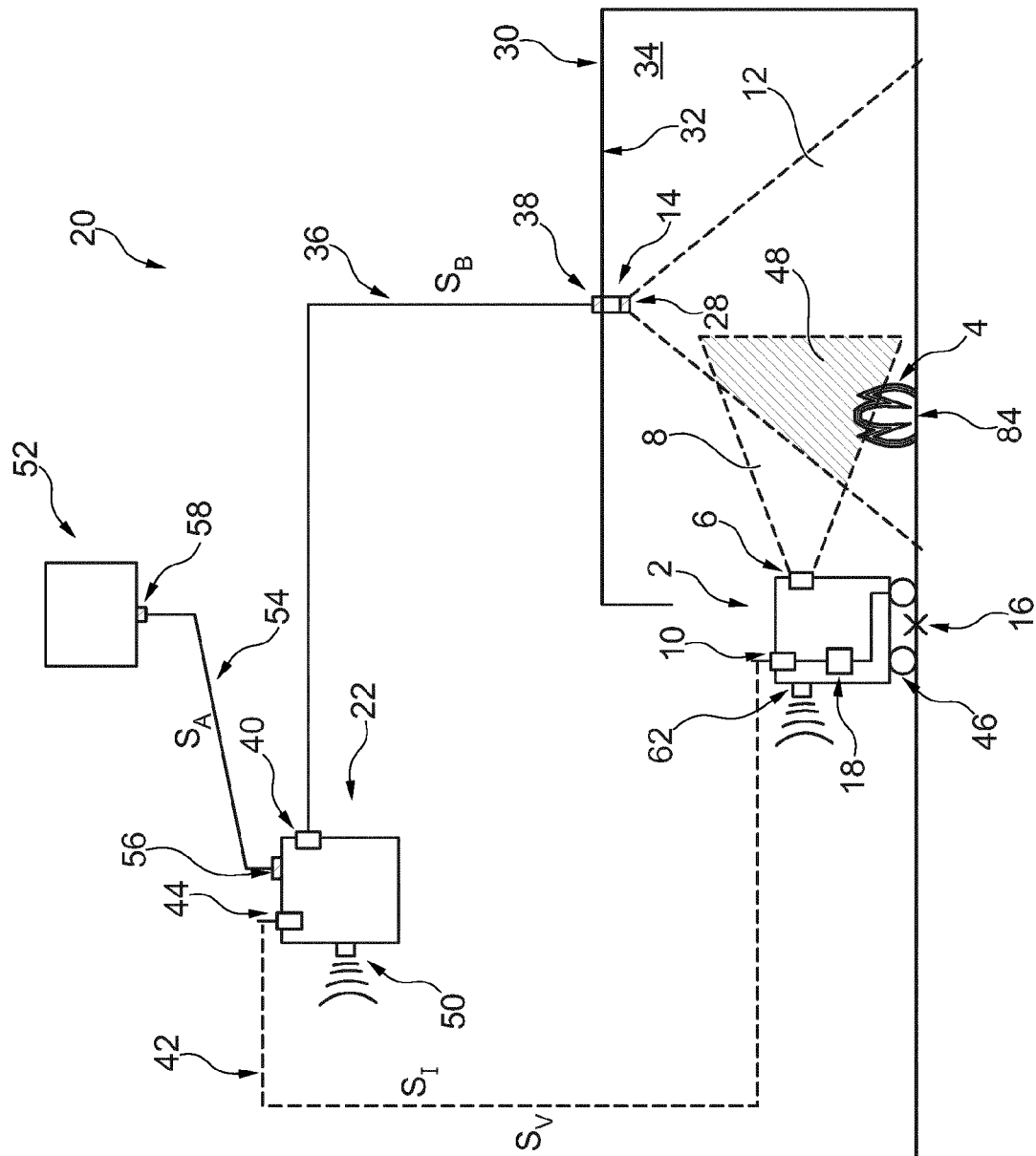
FIG. 2 shows a second embodiment of the system in a schematic illustration.

The system 20 is illustrated schematically in FIG. 2 in such a way that the vehicle 2 has driven to the target location 16. As can be seen from the combined consideration of FIGS. 1 and 2, it is preferably provided that the vehicle 2 is designed as a land vehicle. For this purpose, the land vehicle can thus, for example, have tires 46. Other drive means, such as, for example, a chain drive, however, are also conceivable for a land vehicle. The land vehicle can thus be designed, for example, in the manner of a robot vehicle.

In an advantageous embodiment, a target location 16 for the fire detector 14 and/or for the fire detector monitoring area 12 is stored by the central unit 22. If the central unit 22 thus receives the fire detector signal $S_B$ from the fire detector 14, the central unit 22 can transmit an instruction signal $S_I$, which represents the target location 16, which correspond to the fire detector 14, to the vehicle 2. If a plurality of fire detectors 14 is provided for the system 20, as it is shown schematically in FIG. 3, a corresponding target location 16 can be stored by the central unit 22 for each of the fire detectors 14 and/or for each of the corresponding fire detector monitoring areas 12. If a fire detector signal $S_B$ is now transmitted to the central unit 22 from one of the plurality of fire detectors 14, the instruction signal $S_I$, which is transmitted from the central unit 22 to the vehicle 2, can represent the target location 16, which corresponds to the respective fire detector 14 or fire detector monitoring area 12, respectively.

The target location 16 is thereby characterized in that the vehicle monitoring area 8 is in at least sufficient overlap with the fire detector monitoring area 12, when the vehicle 2 is at the target location 16. In other words, the target location 16 is selected in such a way that, when the vehicle 2 is at this target location 16, an overlap, namely preferably the sufficient overlap, of the vehicle monitoring area 8 with the fire detector monitoring area 12 results. The vehicle monitoring area 8 is preferably in sufficient overlap with the fire detector monitoring area 12, when at least 20%, at least 30%, at least 40%, at least 50%, at least 60%, at least 70%, at least 80% or at least 90% of the fire detector monitoring area 12 is in overlap with the vehicle monitoring area 8. The overlap hereby preferably refers to the overlap 48 between the vehicle monitoring area 8 and the fire detector monitoring area 12 (see FIG. 2). If the vehicle 2 is thus at the target location 16, the desired sufficient overlap of the vehicle monitoring area 8 with the fire detector monitoring area 12 thus results.

Figure 3:
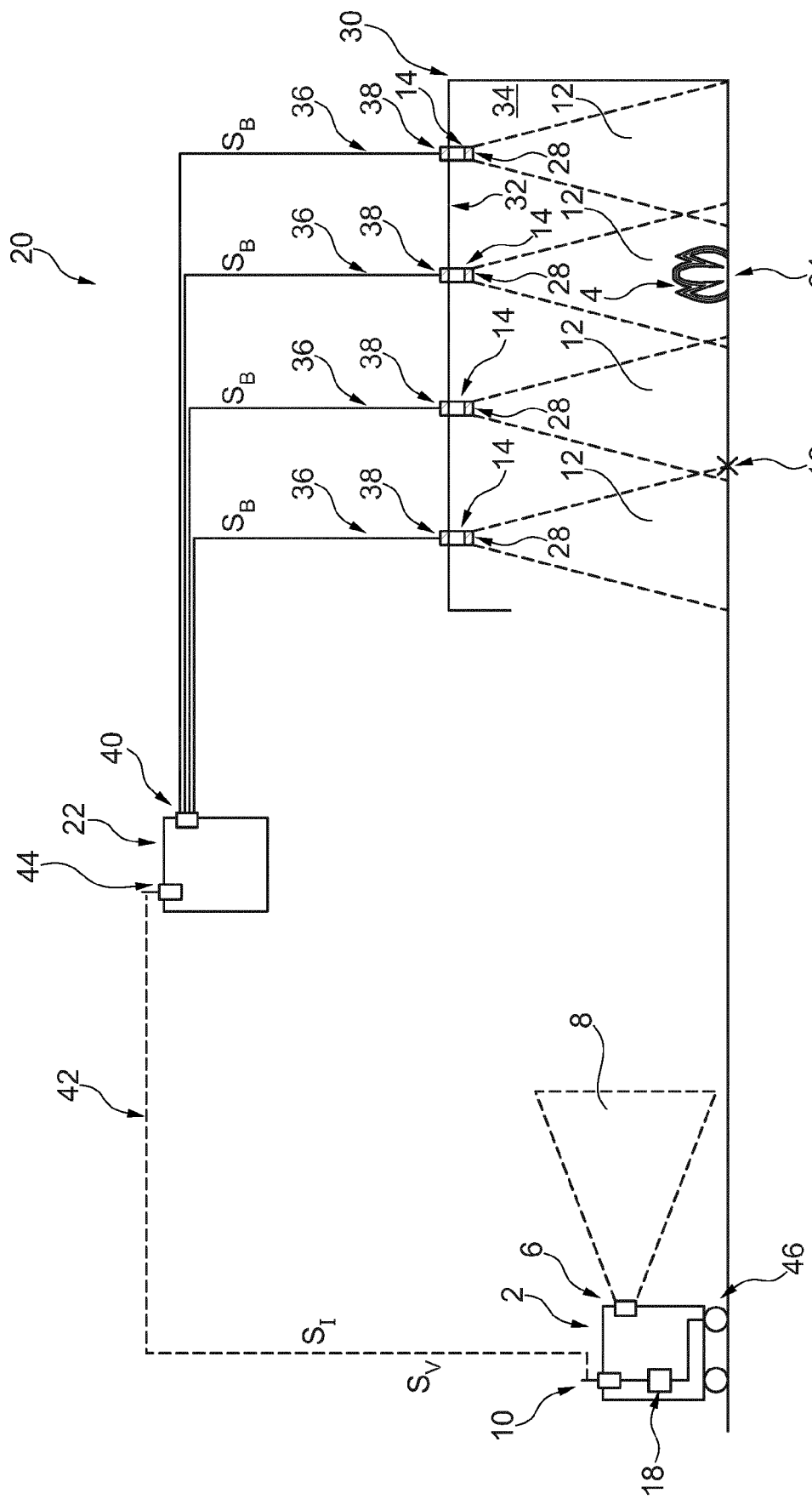
FIG. 3 shows a third embodiment of the system in a schematic illustration.
Figure 18:
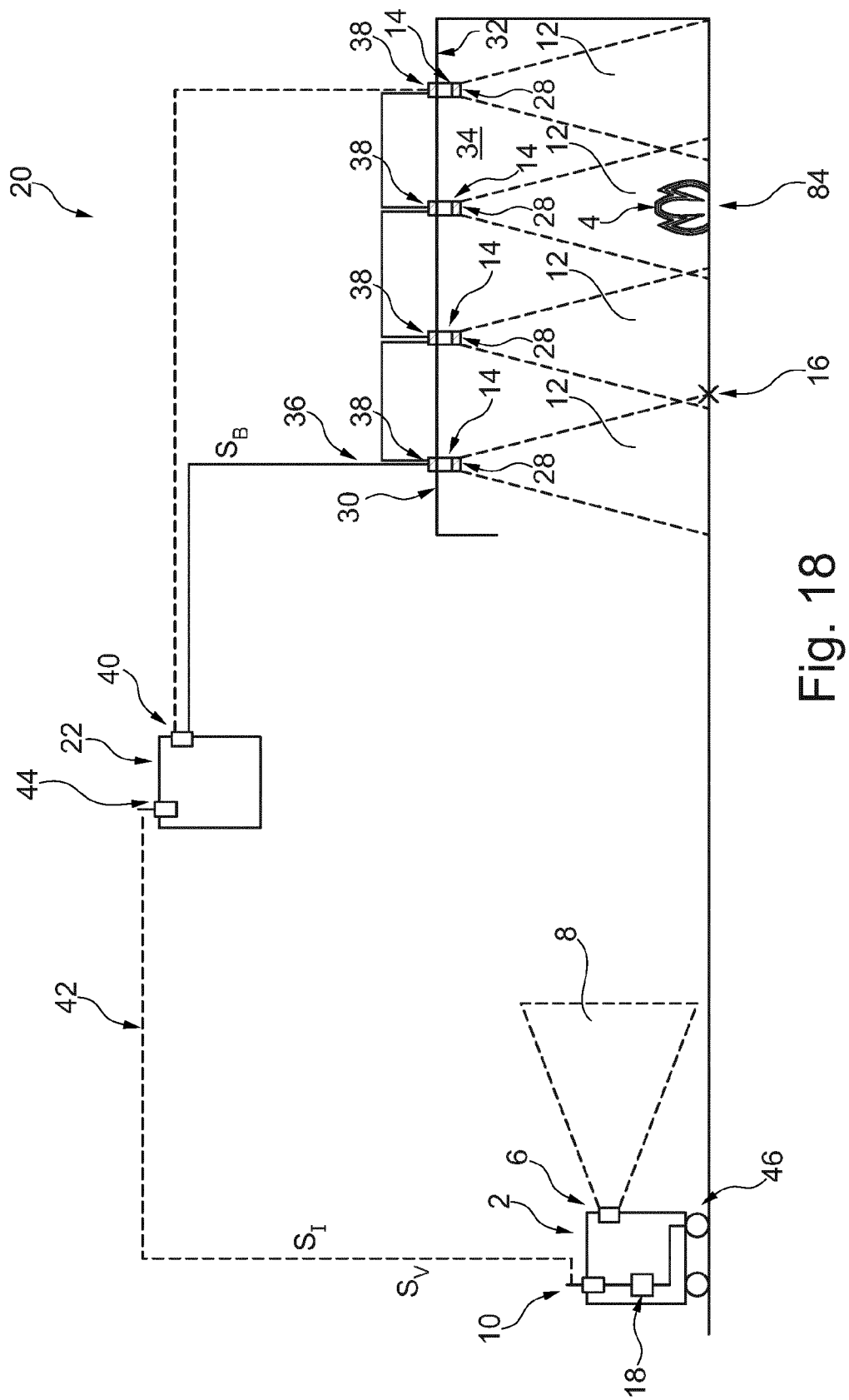
FIG. 18 shows a third embodiment of the system comprising changed signal connection to the fire detectors in a schematic illustration.

It can be gathered from FIG. 3 that a separate signal line 36 can be provided for each of the fire detectors 14. Each of the signal lines 36 extends from a corresponding fire detector 14 to the central unit 22. An alternative signal connection between the fire detectors 14 and the central unit 22 is illustrated in FIG. 18. The central unit 22 and the fire detectors 14 are hereby connected in series by means of a, preferably single, wired signal line 36, As is shown by the section of the signal line 36 shown by means of dashes, the signal line 36 can be embodied in a ring-shaped manner. In the alternative, it can be provided—and in this case without the section shown by means of dashes—that the signal line 36 leads from the central unit 22 to the fire detectors 14 as a type of stub. If a wired signal connection 36 is used for transmitting the fire detector signal $S_B$, the fire detector signal $S_B$ can be represented and/or modeled by a current signal and/or voltage signal. For this purpose, for example the current intensity and/or the voltage potential can be adapted by the fire detector 14, in order to transmit the fire detector signal $S_B$. If the wired signal connection 36 leads from the central unit 22 to the plurality of fire detectors 14, wherein the fire detectors 14 are connected in series by means of the wired signal connection 36, an unambiguous identification can often not take place, from which the plurality of the fire detectors 14, the fire detector signal $S_B$ or the corresponding change, respectively, of the current or of the voltage, respectively, originates. It thus turned out to be an advantageous alternative, when the wired signal connection 36 is designed as a bus line. The central unit 22 and each of the plurality of the fire detectors 14 each form a bus subscriber in this case. Each bus subscriber can have its own bus address, which is also referred to as identifier. As a whole, the bus subscribers and the bus line can thus form a bus system for transmitting information. The bus system is preferably designed as a ring bus system. The information is, for example, the fire detector signal or represents the fire detector signal. A fire detector 14 can thus transmit the fire detector signal $S_B$ to the central unit 22 by means of the bus line 36 or the bus system, respectively. The address of the respective fire detector 14 be transmitted thereby. The transmission can take place, for example, in bit serial form and in the half-duplex method. The fire detector signal $S_B$ or the corresponding data information, respectively, is thereby modulated by the fire detector 14 to a bus supply voltage, which is provided by the central unit 22. The central unit 22 demodulates the corresponding signals, so that the fire detector signal $S_B$ is available to the central unit 22. The central unit 22 furthermore obtains knowledge about which of the fire detectors 14 has sent the fire detector signal $S_B$ to the central unit 22.

As explained above, the vehicle sensor unit 6 of the vehicle 2 is designed for capturing a fire parameter $K_F$ of the vehicle monitoring area 8. Due to the fact that a sufficient overlap of the vehicle monitoring area 8 with the fire detector monitoring area 12 has now taken place, because the vehicle 2 is at the target location 16, a fire parameter $K_F$ of the fire detector monitoring area 12 can be captured by means of the vehicle 2 or by means of the vehicle sensor unit 6 of the vehicle 2, respectively, wherein this captured fire parameter $K_F$ forms the verification fire parameter $K_V$. In other words, the vehicle 2 is configured for capturing the fire parameter $K_F$ at the target location 16 by means of the vehicle sensor unit 6 as a verification fire parameter $K_V$ of the fire detector monitoring area 12.

After the verification fire parameter $K_V$ of the fire detector monitoring area 12 has been captured, two independently captured fire parameters are now present, namely the reference fire parameter $K_R$ and the verification fire parameter $K_V$ for the fire detector monitoring area. As explained above, however, it is preferably provided that the fire detector 14 is designed as a fire gas detector, whereas the vehicle sensor unit 6 of the vehicle 2 preferably has a camera or is formed thereby. However, these fire parameters $K_R$, $K_F$, which are determined independently of one another, can only be compared with difficulty. It is thus provided that the vehicle 2 is configured for determining a further fire status, which is referred to as verification fire status $Z_V$, namely be evaluating the verification fire parameter $K_V$.

For this purpose, the vehicle 2 can have an evaluating unit. The evaluating unit is preferably designed for evaluating the verification fire parameter $K_V$. The evaluating unit is furthermore preferably designed for determining the verification fire status $Z_F$ on the basis of the result of the evaluation. A verification fire status $Z_F$ represents, for example, a fire 4, a fire precursor and/or a smoldering fire. In the case of a fire 4 and/or a smoldering fire, characteristic temperatures are often created, which can be captured, for example, by the vehicle sensor unit 6. It is to be pointed out in this context that the capturing can also include an indirect capturing. If the thermal imaging camera captures, for example, an infrared spectrum, a conclusion can be drawn to a temperature, in particular a maximum and/or average temperature on the basis of this.

Figure 16:
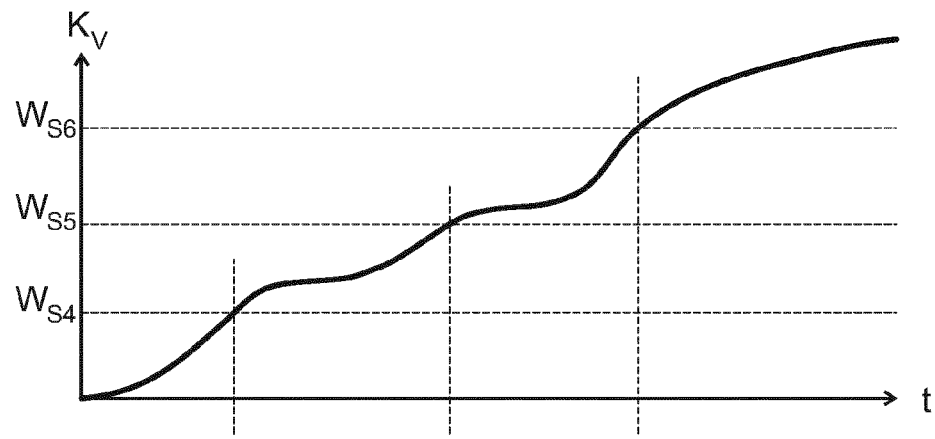
FIG. 16 shows a temporal sequence of the verification fire status in a schematic illustration.
Figure 17:
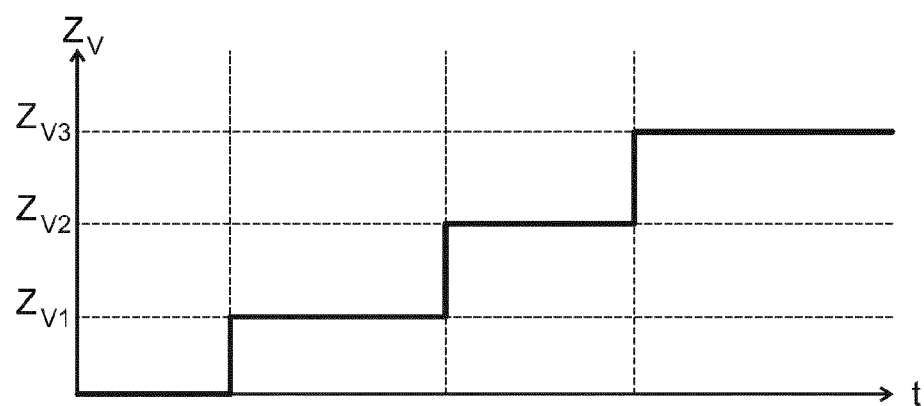
FIG. 17 shows a temporal sequence of the verification fire status in a schematic illustration.

An exemplary value course of the verification fire parameter $K_V$ over the time t is illustrated schematically in FIG. 16. The vehicle 2 and preferably the corresponding evaluating unit can store at least one threshold value $W_{S4}$, preferably a plurality of threshold values $W_{S4}$, $W_{S5}$, $W_{S6}$. These threshold values $W_{S4}$, $W_{S5}$, $W_{S6}$ can be threshold values for the verification fire parameter $K_V$, thus preferably for a temperature, which is captured by the vehicle sensor unit 6. If a verification fire parameter $K_V$, which is captured by means of the vehicle sensor unit 6, exceeds the first of the threshold values $W_{S4}$, this is characteristic, for example, for a smoldering fire. An exemplary status course of the verification fire status $Z_V$ over the time t and corresponding to the value course of the verification fire parameter $K_V$ from FIG. 16 is illustrated schematically in FIG. 17. If the captured verification fire parameter $K_V$ reaches and/or exceeds the threshold value $W_{S4}$, a reference fire status $Z_{R4}$, which corresponds, for example, to a smoldering fire, can be determined on the basis of this. If, for example, a higher verification fire parameter $K_V$, thus in particular a higher temperature, is captured, the verification fire parameter $K_V$ can reach and/or exceed the further of the threshold values $W_{S5}$, so that this can be characteristic for a fire precursor and a corresponding reference fire status $Z_{V5}$ can be determined. If the captured verification fire parameter $K_V$ reaches and/or exceeds the further threshold value $W_{S6}$, a verification fire status $Z_{V6}$, which corresponds, for example, to a fire 4, can be determined on the basis of this. It is thus preferably provided that the evaluating unit of the vehicle 2 is designed for determining a verification fire status $Z_V$ on the basis of the captured verification fire parameter $K_V$, and preferably by using at least one threshold value $W_{S4}$, $W_{S5}$, $W_{S6}$.

The verification fire status $Z_V$, which can thus now be determined, thereby preferably corresponds to a fire 4, a fire precursor and/or a smoldering fire, namely as a function of the verification fire parameter $K_V$. The verification fire status $Z_V$ can thus be compared to the reference fire status $Z_R$, which also corresponds to a fire 4, a fire precursor and/or a smoldering fire. It is thus now possible to review the reference fire status $Z_R$ and to possibly determine it as confirmed or verified reference fire status $Z_{VR}$, respectively.

For the, in particular automatic determination of the verified reference fire status $Z_{VR}$ for the fire detector monitoring area 12, two alternatives are provided according to the invention, which preferably alternatively further embody the above-explained system 20. The first alternative is to be discussed first, whereby this is followed by the discussion of the second alternative. It can generally be provided, however, that the system is further developed by both alternatives.

According to the first alternative, the vehicle 2 is designed for transmitting a verification signal $S_V$, which represents the verification status $Z_V$, to the central unit 22. The signal connection 42 between the central unit 22 and the vehicle 2 can be used for this purpose. The signal receiving unit 10 can be designed as a signal sending and signal receiving unit in this case, thus as a communication unit. The signal sending unit 44 of the central unit 22 can furthermore be designed as a signal sending and signal receiving unit, thus a communication unit. The signal connection 42 between the central unit 22 and the vehicle 2 can thus serve the purpose of the bidirectional transmission of signals.

It is furthermore provided that the central unit 22 is configured for determining the reference fire status $Z_R$ as verified reference fire status $Z_{VR}$, in the event that the reference fire status $Z_R$ and the verification fire status $Z_V$ correspond at least sufficiently. The sufficient correspondence can preferably exist when the verification fire status $Z_V$ corresponds to a fire 4 and the reference fire status $Z_R$ corresponds to a fire 4, a fire precursor or a smoldering fire. The sufficient correspondence can furthermore be present, when the verification fire status $Z_V$ and the reference fire status $Z_R$ each correspond to a fire precursor or a smoldering fire.

The above-explained determination of the verified reference fire status $Z_{VR}$ thus only takes place when the verification fire status $Z_V$ corresponds to the reference fire status $Z_R$ or when the verification fire status $Z_V$ corresponds to a more strongly developed fire process. The verified reference fire status $Z_{VR}$ can thus also be referred to and/or considered to be a reviewed and/or reliable reference fire status. The verified reference fire status $Z_{VR}$ thus serves as reliable basis for initiating and/or performing follow-up actions. An extinguishing action for the fire detector monitoring area 12 can thus, for example, be initiated on the basis of the verified reference fire status $Z_{VR}$, for example for extinguishing a corresponding fire 4.

An advantage of the above-explained system 20 can be seen in that the verification of a reference fire status $Z_R$, which is determined by a fire detector 14, can take place in an automated manner, so that the verified reference fire status $Z_{VR}$ can possibly be determined in a very short time, in order to initiate corresponding follow-up actions, which can avoid and/or significantly reduce property damages and/or personal injuries in the fire detector monitoring area 12. An engagement by a person in the system 20 is not necessary hereby, because the instruction signal $S_I$ is preferably sent by the central unit 22 in an automated manner and a preferably automatic navigation of the vehicle 2 to the target location 16 is carried out thereupon, whereupon a capturing, which is preferably also automated, of the verification fire parameter $K_V$ can take place. A verification fire status $Z_V$, which is based on this and which is preferably determined automatically, can then also be transmitted back to the central unit 22 again in an automated manner, so that the determination of the verified reference fire status $Z_{VR}$ can also take place in an automated manner here, when the corresponding sufficient correspondence between the reference fire status $Z_R$ and the verification fire status $Z_V$ is present.

The discussion of the second alternative as a further development of the system 20 follows hereinafter. According to this, it is provided that the instruction signal $S_I$ furthermore represents the reference fire status $Z_R$. With the transmission of the instruction signal $S_I$ from the central unit 22 to the vehicle 2, the target location 16 and the reference fire status $Z_R$ is thus made available to the vehicle 2. The vehicle 2 is furthermore configured for determining the reference fire status $Z_R$ as verified reference fire status $Z_{VR}$, in the event that the reference fire status $Z_R$ and the verification fire status $Z_V$ correspond at least sufficiently. With regard to the sufficient correspondence, reference is made analogously to the preceding explanations. The vehicle 2 is furthermore designed for transmitting the verification signal $S_I$, which now represents the verified reference fire status $Z_{VR}$, to the central unit 22. The verified reference fire status $Z_{VR}$ is thus provided to the control unit 22 by the transmission of the verification signal $S_f$. In correspondence and analogously to the explanations relating to the preceding alternative, the central unit 22 can be designed to initiate a follow-up action, such as for example an extinguishing action, for example for initiating the extinguishing of a fire 4 in the fire detector monitoring area 12. Insofar as it is expedient, reference is made analogously to further features, advantages and/or effects from the explanations relating to the alternative 1.

Insofar as the reference fire status $Z_R$ has been determined as verified reference fire status $Z_{VR}$, the corresponding information is present in a secured manner, so that a fire, a corresponding fire precursor and/or a corresponding smoldering fire, which corresponds to the verified reference fire status $Z_{VR}$, is present in the fire detector monitoring area 12. The central unit 22 can thus be designed for determining an alarm signal $S_A$ on the basis of the verified reference fire status $Z_{VR}$. The alarm signal $S_A$ can serve the purpose of initiating follow-up actions. The alarm signal $S_A$, or a signal based thereon, can thus be acoustically and/or optically output by means of an output unit 50 of the central unit 22. Personnel, which is in the vicinity of the central unit 22, is thus alerted or notified, respectively, by the acoustic and/or optical output of the alarm signal $S_A$ or of the signal based therein, respectively. In the alternative or in addition, it can be provided that the alarm signal $S_A$ is sent to a further unit. The further unit can, for example, be a so-called control center 52. The control center 52 can thereby be designed for receiving the alarm signal $S_A$. The control center 52 can furthermore be designed for acoustically and/or optically outputting the alarm signal $S_A$ or a signal based thereon. An alarm signal $S_A$ can furthermore be registered and/or stored by the control center 52 in order to subsequently analyze and/or trace possible follow-up actions, such as for example an extinguishing action. To transmit the alarm signal $S_A$ from the central unit 22 to the control center 52, a signal connection 54 can be designed between the central unit 22 and the control center 52. The central unit 22 preferably has a further signal sending unit 56 and the control center 52 has a signal receiving unit 58, wherein a signal line connection extends between the signal sending unit 56 of the central unit 22 and the signal receiving unit 58 of the control center 52, so that the alarm signal $S_A$ can be transmitted from the central unit 22 to the control center 52 therewith.

If the reference fire status $Z_R$ has not been determined as verified reference fire status $Z_{VR}$, the information is present that the fire or fire precursor, respectively, and/or smoldering fire, which corresponds to the reference fire status $Z_R$, could not be confirmed. This can be due to a faulty determination of the reference fire status $Z_R$. To now prevent that a possible extinguishing action is carried out in the fire detector monitoring area 12, it turned out to be advantageous, when the corresponding information is made available to the personnel at the central unit 22 and/or the control center 52. The control center 22 is thus preferably designed for determining a false alarm signal $S_F$, which represents a faulty determination of the reference fire status $Z_R$ and/or a non-verified reference fire status, in the event that the reference fire status $Z_R$ has not been determined as verified reference fire status $Z_{VR}$. It can be provided thereby that the false alarm signal $S_B$ or a signal based thereon is output acoustically and/or optically, preferably by means of the output unit 50. It can furthermore be provided that the false alarm signal is transmitted to a further unit, preferably the control center 52. With regard to this, reference is made analogously to the preceding explanations, effects and/or advantages, as they have been discussed for the transmission of the alarm signal $S_A$. The control center 52 can be designed for acoustically and/or optically outputting the received false alarm signal $S_B$ or a signal based hereon. The false alarm signal $S_F$ can furthermore be registered and/or stored by the control center 52, in order to be able to review and/or trace possible follow-up actions later on.

It furthermore turned out to be advantageous when, for alarming persons in the fire detector monitoring area 12 and/or in the immediate vicinity thereof, the vehicle 2 informs about a possible fire, a possible fire precursor and/or a possible smoldering fire, provided that the reference fire status $Z_R$ corresponds to the verification fire status $Z_V$ determined by the vehicle. The vehicle 2 can thus be designed for determining a further alarm signal on the basis of the verification fire status $Z_V$ and/or on the basis of the verified reference fire status $Z_{VR}$. The vehicle 2 can thus have an output unit 62 and can be designed and/or configured for optically and/or acoustically outputting the further alarm signal by means of the output unit 62. For this purpose, persons in the fire detector monitoring area 12 or in the immediate vicinity thereof can thus be informed about the corresponding danger situation, so that the persons can leave the fire detector monitoring area 12 and/or the area in the immediate vicinity thereof for this purpose and can thus get to safety. Personal injuries can be avoided particularly reliably and quickly in this way.

The vehicle 2 can furthermore be designed for determining a further false alarm, which represents a faulty determination of the reference fire status $Z_R$ and/or a non-verified reference fire status, in the event that the reference fire status $Z_R$ has not been determined as verified reference fire status $Z_{VR}$. The false alarm signal can be output acoustically and/or optically by means of the output unit 62 of the vehicle 2. The vehicle can be designed and/or configured accordingly for this purpose. Insecurities of persons, who are present, for example, in the fire detector monitoring area 12, can be avoided or reduced by the output of the further false alarm signal by the vehicle 2. This is so, because persons in the fire detector monitoring area 12 can initially become alarmed with the appearance of the vehicle 2 and can already draw a conclusion to a possible fire based on the presence of the vehicle 2, even though this fire may not exist. By the output of the further false alarm signal by means of the output unit 62 of the vehicle 2, the information that this is not an alarm situation, can be made available to the mentioned persons, which contributes to calming the mentioned persons.

It can be expedient in particular for larger buildings 30 that the system 20 has a plurality of stationary fire detectors 14. This is shown in an exemplary and schematic manner in FIG. 3.

The plurality of stationary fire detectors 14 can thereby be fastened to the ceiling 32 spaced apart from one another. A fire detector monitoring area 12 is assigned to each of the fire detectors 14. The fire detectors 14 can thereby be arranged relative to one another in such a way that fire detector monitoring areas 12 of adjacent fire detectors 14 intersect and/or overlap. This ensures a particularly reliable monitoring of the room 34 of the building 30 to a possible fire 4, a possible fire precursor and/or a possible smoldering fire. Each of the fire detectors 14 is thereby preferably embodied and/or designed analogously, as it has been explained in connection with the previous figures for an individual fire detector 14. It is furthermore provided that each of the fire detectors 14 is connected to the central unit 22 by means of a signal line 36. In the alternative, a signal line 36, which is designed as signal bus, can be provided, as it is illustrated schematically for example in FIG. 18, to which the fire detectors 14 and the central unit 22 are coupled, so that a fire detector signal $S_B$ can be transmitted from a fire detector 14 to the central unit 22, wherein the fire detector signal $S_B$ can now also represent the address of the respective fire detector 14.

Figure 4:
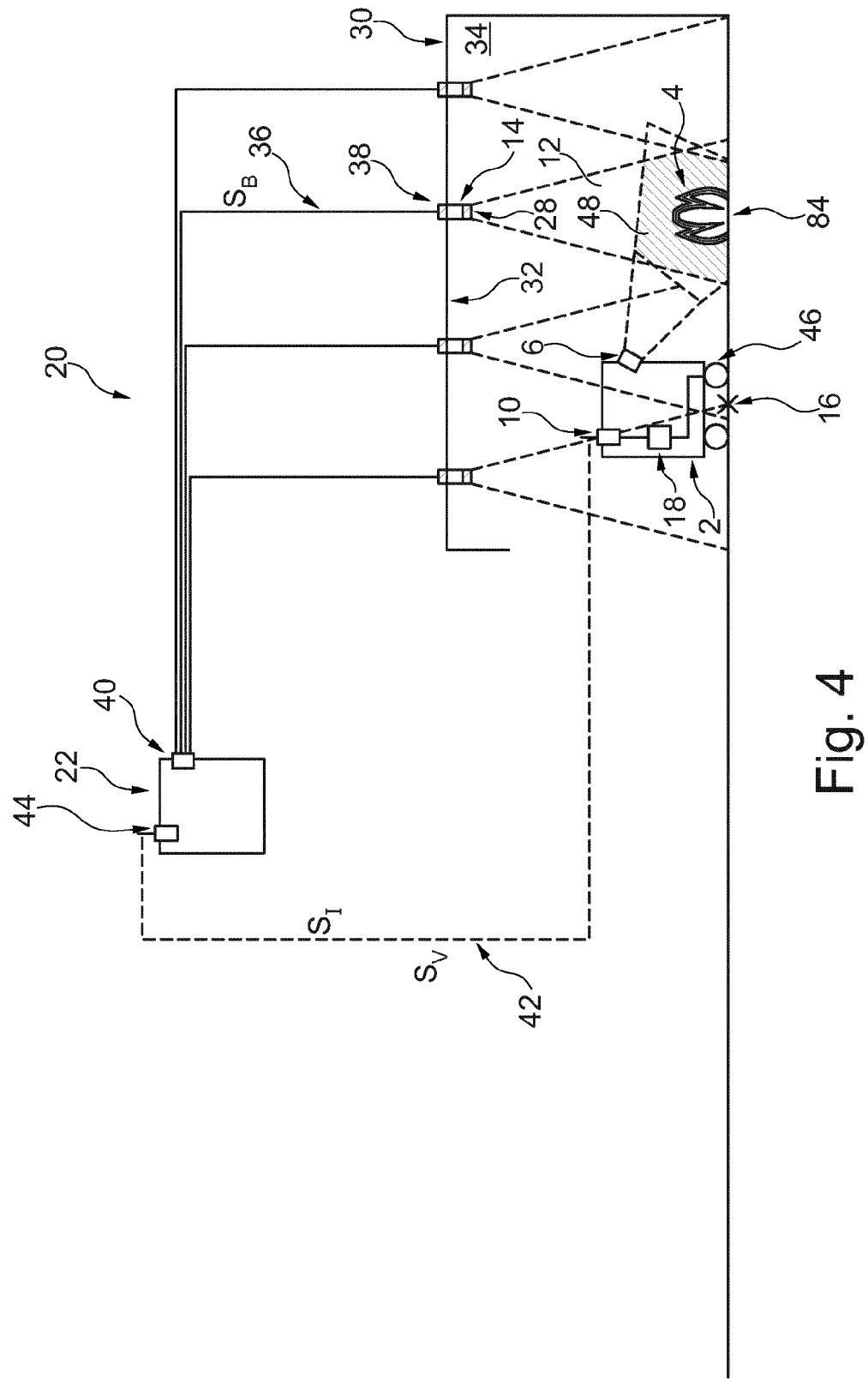
FIG. 4 shows a fourth embodiment of the system in a schematic illustration.

If there is now a fire 4 in the fire detector monitoring area 12 of one of the fire detectors 14, the corresponding fire detector 14 determines a reference fire parameter $K_R$, which corresponds to the fire 4, and a reference fire status $Z_R$ is determined on the basis of this. The corresponding fire detector 14 then transmits a fire detector signal $S_B$ to the central unit 22, wherein the mentioned fire detector signal $S_B$ represents the corresponding reference fire status $Z_R$. If the fire detectors 14 are connected individually to the central unit 22 by means of a corresponding signal connection 36, the central unit 22 can already determine the fire detector 14, which has transmitted the fire detector signal $S_B$ to the central unit 22, on the basis of the parallel connections of the fire detectors 14. It can furthermore be provided that the fire detector signal $S_B$ furthermore represents an identifier, in particular bus identifier, which serves the purpose of identifying the fire detector 14 and/or the fire detector location of the respective fire detector 14. The identifier can also be referred to as address. The central unit 22 can thus draw a conclusion to the location of the fire detector 14 on the basis of the identifier. If this information is present, the central unit 22 can be designed for determining a target location 16 for the vehicle 2 on the basis of the fire detector location or on the basis of the identifier, respectively. The central unit 22 is thus preferably configured for determining the instruction signal $S_I$ in such a way that the instruction signal $S_I$ represents at least one target location 16 for the vehicle 2, in the case of which the vehicle monitoring area 8, when the vehicle 2 is at the target location 16, is in sufficient overlap with the fire detector monitoring area 12, the reference fire parameter $K_R$ of which has been captured by the fire detector sensor unit 28 of the fire detector 14, which has transmitted the fire detector signal $S_B$ to the central unit 22. If the instruction signal $S_I$ has been transmitted to the vehicle 2, the vehicle 2 navigates to the corresponding target location 16. This is shown schematically and in an exemplary manner in FIG. 4.

Figure 5:
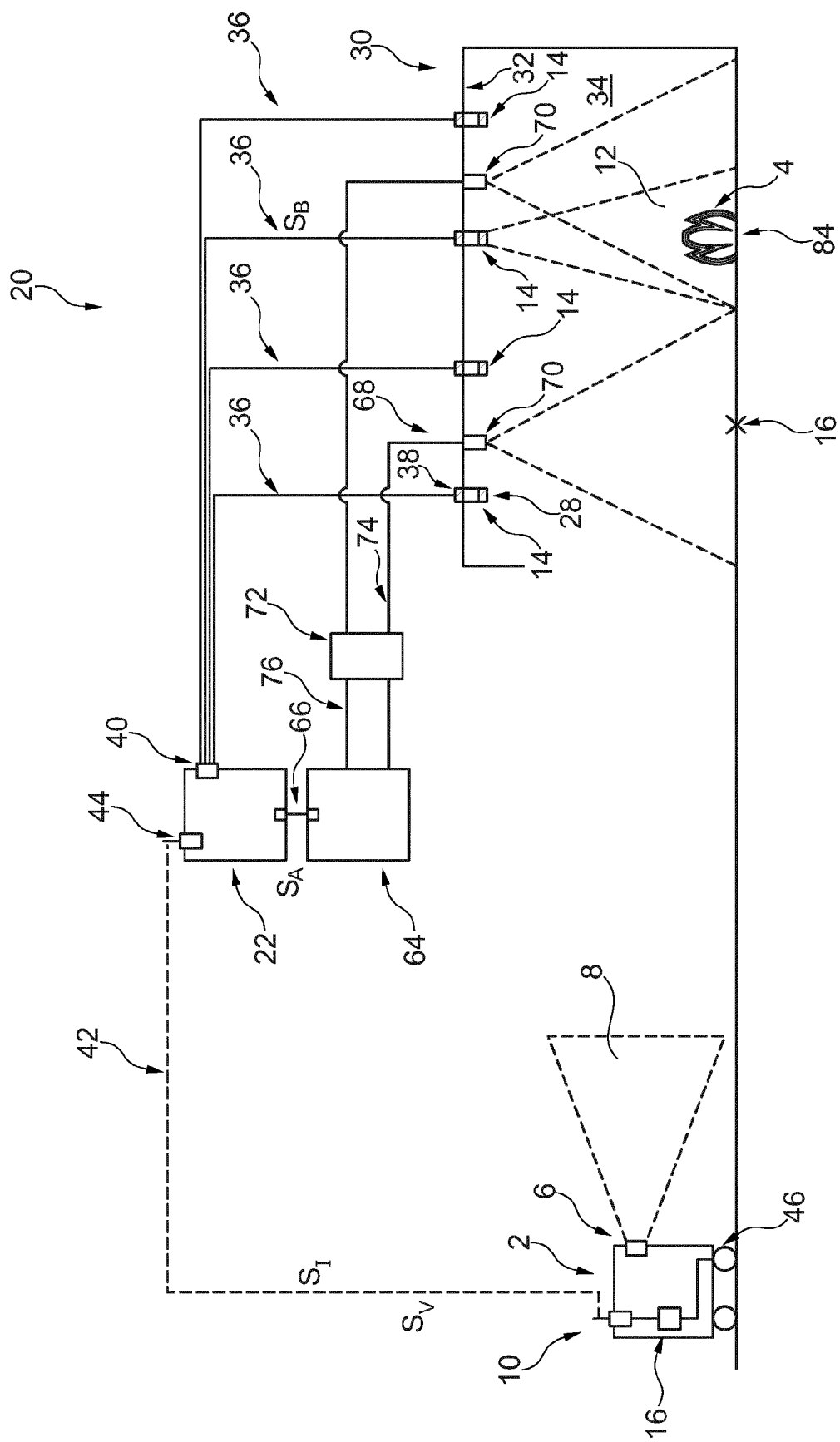
FIG. 5 shows a fifth embodiment of the system in a schematic illustration.

If a verified reference fire status $Z_{VR}$ is then determined and if an alarm signal $S_A$ is determined on the basis of this, the alarm signal $S_A$ can serve the purpose of initiating a follow-up action, such as for example a fire extinguishing action. For the extinguishing of a fire 4, the system 20 can have an extinguishing control center 64, as it is shown schematically, for example, in FIG. 5. It is provided thereby that the alarm signal $S_A$ is transmitted from the central unit 22 to the extinguishing control center 64. For this purpose, a signal connection 66 can be formed between the central unit 22 and the extinguishing control center 64, in order to transmit the alarm signal $S_A$ from the central unit 22 to the extinguishing control center 64. In the alternative, it can be provided that the central unit 22 and the extinguishing control center 64 are designed at least partially as a joint functional unit. This functional unit can also be referred to as fire detector and extinguishing control center.

The extinguishing control center 64 is preferably designed in the manner of a device. The extinguishing control center 64 is furthermore designed for controlling an extinguishing installation 68, namely on the basis of the transmitted alarm signal $S_A$. The extinguishing installation 68 can thereby be encompassed by the system 20. The extinguishing installation 68 can have at least one, preferably a plurality of extinguishing nozzles 70 for outputting extinguishing agents. Instead of the extinguishing nozzle 70 or the extinguishing nozzles 70, respectively, other means can also be provided, which are suitable for outputting extinguishing agent. When reference is made hereinafter to an extinguishing nozzle 70, this is to thus also refer to another agent for outputting extinguishing agent. The extinguishing agent installation 68 can have an extinguishing agent source 72. The extinguishing agent source 72 can have, for example, an extinguishing agent tank, in which extinguishing agent is stored, and a pump, by means of which extinguishing agent can be conveyed out of the extinguishing agent tank. The extinguishing agent source 72 can thus be designed in the manner of a device and/or unit. Each extinguishing nozzle 70 is coupled at least indirectly to the extinguishing agent source 72 or to the corresponding pump, respectively, by means of a pipeline 74, so that extinguishing agent can be conveyed from the extinguishing agent source 72 to the respective extinguishing nozzle 70. The extinguishing agent source 72 is connected to the extinguishing control center 64 by means of a signal control line 76, so that the extinguishing agent source 72, in particular the corresponding pump, can be controlled by the extinguishing control center 64. As can be seen in an exemplary manner from FIG. 5, a plurality of extinguishing nozzles 70 can be fastened to the ceiling 32. The extinguishing nozzles 70 are thereby preferably spaced apart from one another in such a way that a fire 4 can be extinguished in each area or a predetermined area of the room 34. It can be provided thereby that the alarm signal $S_A$ (also) represents a location of a fire 4, which is to be extinguished, and wherein the extinguishing control center 64 is designed for controlling the extinguishing installation 68 on the basis of the transmitted alarm signal $S_A$, in order to extinguish a fire 4 in the fire detector monitoring area 12, the reference fire parameter $K_R$ of which has been captured by the fire detector sensor unit 28 of the fire detector 14, which has transmitted the fire detector signal $S_B$ to the central unit 22. The extinguishing control center 64 is thus preferably designed for controlling the extinguishing installation 68, namely on the basis of the transmitted alarm signal $S_A$ for extinguishing a fire 4, which corresponds to the verified fire status $Z_{VR}$.

Figure 6:
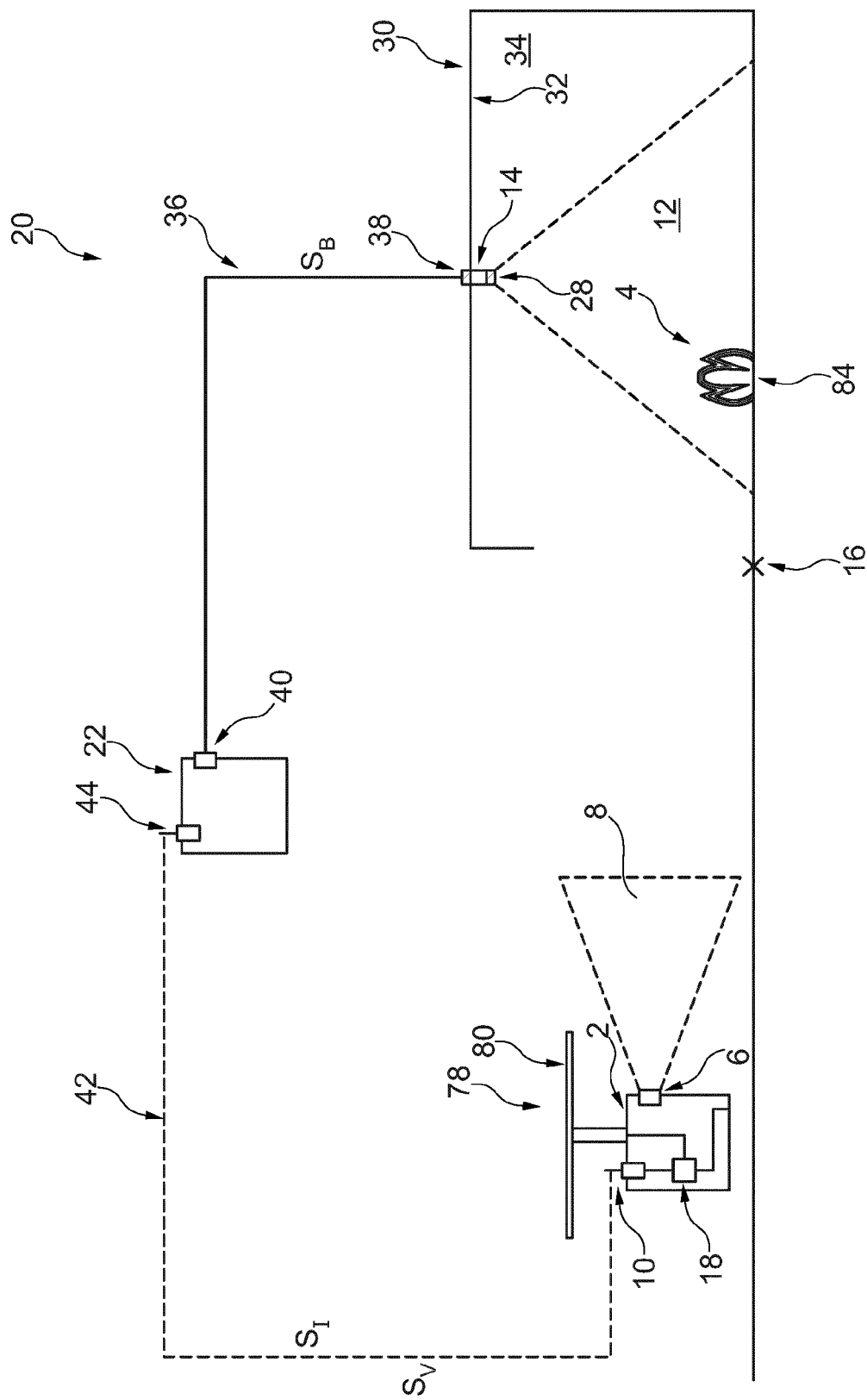
FIG. 6 shows a sixth embodiment of the system in a schematic illustration.

In connection with FIGS. 1 to 5, the vehicle 2 has been illustrated schematically as a land vehicle. The vehicle 2, however, can generally be designed as any type of vehicle 2. A further advantageous embodiment of the vehicle 2 is illustrated in FIG. 6. The vehicle 2 can accordingly be designed as an aircraft, in particular a drone. The aircraft preferably has at least one rotor 78. The rotor 78 can be coupled to a plurality of rotary wings 80 for ensuring the corresponding lift and propulsion. Particularly preferably, the aircraft is designed as a helicopter and/or as a multicopter, for example a quadrocopter and/or an octocopter. Provided that the vehicle 2 is designed as an aircraft, this provides the advantage that areas, which are difficult to access, can also be approached, in order to capture a fire parameter $K_F$ or a verification fire parameter $K_V$, respectively, by means of the vehicle sensor unit 6. Reference is moreover analogously made to the prior explanations, preferred features, effects and/or advantage relating to the vehicle 2.

It furthermore turned out to be advantageous when a measuring principle of the fire detector sensor unit 28 of the fire detector 14 and a measuring principle of the vehicle sensor unit 6 of the vehicle 2 are different. The fire detector 14 can thus be designed, for example, as a combustion gas detector or as a smoke detector. In this case, the fire detector sensor unit 28 is designed for measuring combustion gas and/or smoke and for capturing a reference fire parameter $K_R$ on the basis of this. A concentration or concentration change of a predetermined gas or of smoke particles, respectively, can thus be measured, for example by means of the fire detector sensor unit 28, when the latter is preferably designed as combustion gas detector or smoke detector, in order to capture the reference fire parameter $K_R$ on the basis of this. The measuring principle of the fire detector sensor unit 28 is thus based on the measurement of smoke particles or combustion gas, respectively. It is preferably provided for the vehicle sensor unit 6 of the vehicle 2 that the vehicle sensor unit 6 has a camera. The camera can be designed, for example, as an optical camera for recording an optical image 82, as it is illustrated schematically, for example, in FIG. 7. It is preferably further provided that the vehicle sensor unit 6 additionally, or instead of the camera, has a smoke detector, a temperature detector, a flame detector and/or a combustion gas detector.

If the vehicle 2 is at the target location 16, an image of the fire detector monitoring area 12 can be recorded by means of the camera. If this has taken place and if there is a fire 4 in the fire detector monitoring area 12, the fire 4 is also reproduced by the image 82. The vehicle sensor unit 6 of the vehicle 2 can be designed for capturing a fire parameter $K_F$ on the basis of the image 82. For this purpose, the vehicle sensor unit 6 can be designed for evaluating the image 82, so that the corresponding fire parameter $K_F$ can be determined on the basis of the evaluation. Instead of for recording an optical image 82, the camera can also be designed for recording a thermal image. The camera can be designed as a thermal imaging camera in this case. Reference is made analogously in this connection to the previous explanation. The measuring principle of the vehicle sensor unit 6 is thus preferably based on an optical capturing of an image and on a corresponding evaluation for capturing the fire parameter $K_F$ by means of the vehicle sensor unit 6. It can be seen by means of the embodiment alternatives for the fire detector sensor unit 14 and the vehicle sensor unit 6 explained before in an exemplary manner that the fire detector sensor unit 14 and the vehicle sensor unit 6 can be based on different measuring principles. It can thus be prevented that a measuring principle-related faulty measurement of the fire detector 14 leads to an unnecessary and/or possibly faulty triggering of a follow-up action, in particular of an extinguishing action. This is so, because it can be ensured by means of the measuring principle of the vehicle sensor unit 6, which differs from the fire detector sensor unit 14, that a fire parameter $K_F$ or verification fire parameter $K_V$, respectively, of the fire detector monitoring area 12 can be captured, which possibly does not lead to the measuring principle-related faulty measurement. This allows for a reliable review or verification, respectively, of a reference fire status $Z_R$ of the fire detector monitoring area 12.

The design of the vehicle sensor unit 6 with a camera provides a further advantage. This is so, because the vehicle 2 can be designed for determining a fire location 84 by means of the vehicle sensor unit 6, when the vehicle 2 is at the target location 16. The fire location 84 is thereby the location of the fire 4, the fire precursor and/or of the smoldering fire. If the vehicle 2 is at the target location 16, an image 82 of the fire detector monitoring area 12 can be recorded by means of the camera. By evaluating the image 82, preferably by means of an evaluating unit of the vehicle 2, the fire location 84 can then be determined. This is so, because the target location 16 is known to the vehicle 2. A conclusion to the position of the vehicle sensor unit 6 or of the camera, respectively, can be drawn therefrom. A conclusion to the fire location 84 can furthermore be drawn by means of triangulation, namely in consideration of the target location 16 and of the image 82, so that said fire location can be determined by the vehicle 2. The image 82 can thereby be captured by means of an individual recording by means of the camera of the vehicle sensor unit 6. It can also be provided, however, that a plurality of images can be recorded by means of the camera of the vehicle sensor unit 6, which each correspond to different rotating and/or pivot positions of the camera, of the vehicle sensor unit 6 and/or of the vehicle 2, wherein the vehicle 2 is at least essentially at the target location 16. The plurality of images can thus be recorded such that the corresponding images are recorded during a rotation of the vehicle 2 at the target location 16 and/or during a rotation of the camera or of the vehicle sensor unit 6, respectively. The joint image 82 can then be formed from the plurality of the images. This image 82 can then serve as basis for determining the fire location 84. As can be seen schematically from FIG. 7, the fire 4, and thus the fire source, is illustrated in the center in the bottom third of the image 82. The fire 4 is thus located obliquely below the vehicle sensor unit 6, as is illustrated for example in FIG. 2.

Figure 8:
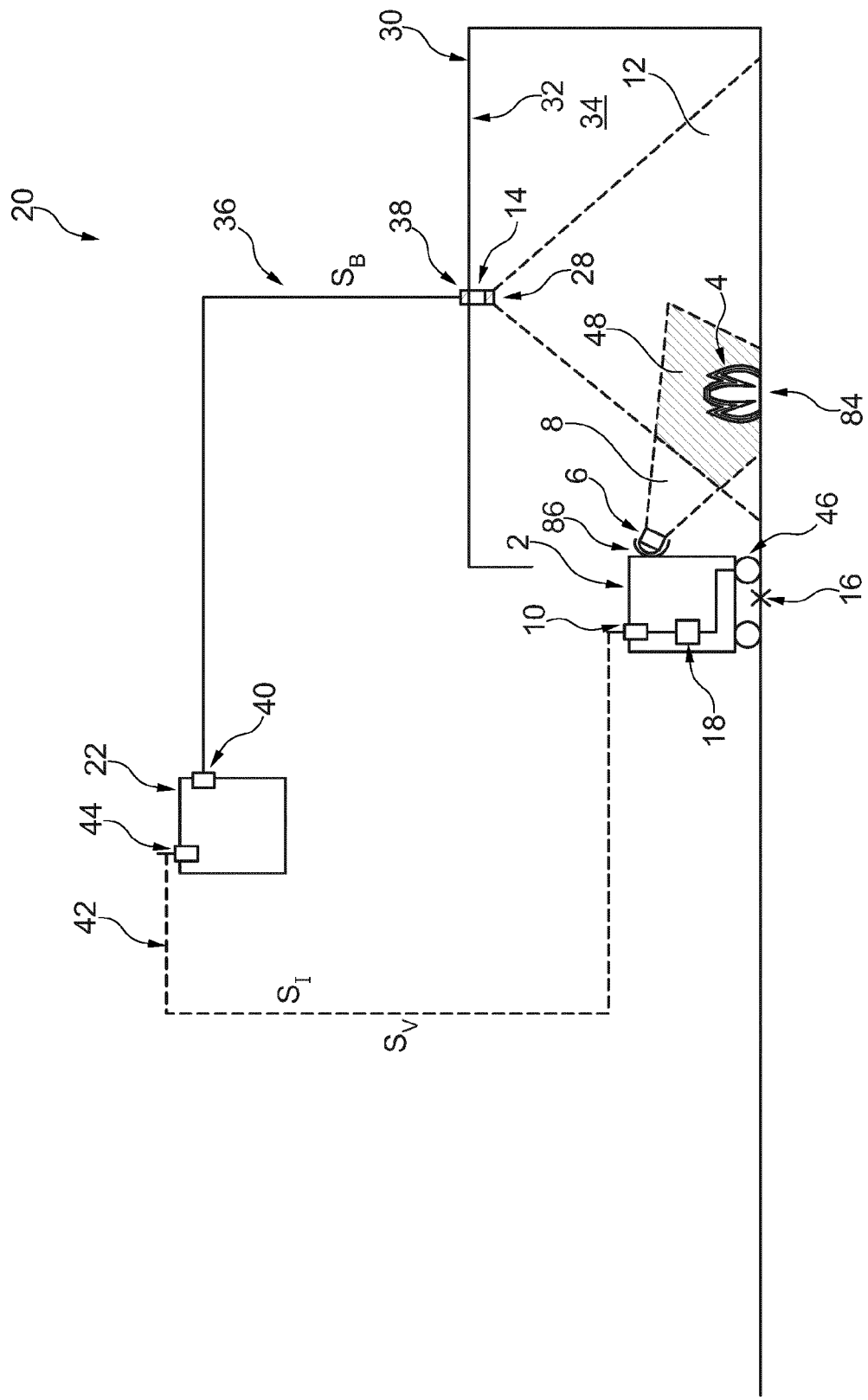
FIG. 8 shows a seventh embodiment of the system in a schematic illustration.

To capture a fire parameter $K_F$, which is as meaningful as possible, by means of the vehicle sensor unit 6, it is preferably provided that the vehicle 2 is designed for aligning the vehicle sensor unit 6 in the direction of the fire location 84, namely in particular when the vehicle 2 is at the target location 16. A corresponding alignment of the vehicle sensor unit 6 in the direction of the fire location 84 is illustrated schematically in FIG. 4. To provide for the alignment of the vehicle sensor unit 6, the vehicle 2 can have a rotatable and/or pivotable aligning device 86, to which at least a part of the vehicle sensor unit 6, in particular the corresponding camera, is fastened, wherein the vehicle 2 is designed for controlling the aligning device 86 in order to align the vehicle sensor unit 6 or the corresponding camera, respectively, namely preferably in the direction of the fire location 86. An exemplary design of the vehicle 2 with an aligning device 86 is illustrated schematically in FIG. 8.

The aligning device 86 can have a joint unit, which can be controlled by an actuator, so that a rotation and/or pivoting of the vehicle sensor unit 6 or of the corresponding camera, respectively, is made possible by controlling the actuator. The instruction signal $S_I$ can furthermore have at least one parameter for the control of the aligning device 86, so that the vehicle sensor unit 6 or the corresponding camera, respectively, can take place by controlling the aligning device 86 on the basis of the mentioned parameter in order to bring the vehicle monitoring area 8 at least in sufficient overlap with the fire detector monitoring area 12, when the vehicle 2 is a target location.

In the alternative or in addition, it can be provided that the alignment of the vehicle sensor unit 6 takes place in the direction of the fire location 84 by means of controlled navigation of the vehicle 2 itself. The vehicle 2 can thus carry out, for example, a rotation about the vertical axis on the basis of the instruction signal $S_I$ at the target location 16, so that the vehicle sensor unit 6 is aligned in the direction of the vehicle monitoring area 12 and/or of the fire location 84. It can thus be ensured that the desired, at least sufficient overlap between the vehicle monitoring area 8 and the fire detector monitoring area 12 results.

It furthermore turned out to be advantageous when the vehicle 2 is configured for capturing the verification fire parameter $K_V$ of the fire detector monitoring area 12 only when the vehicle sensor unit 6 is aligned in the direction of the fire location 84. The vehicle 2 can thus initially drive to the target location 16 on the basis of the instruction signal $S_I$ and can then carry out the alignment of the vehicle sensor unit 6 in the direction of the fire location 84, so as to then capture the fire parameter $K_V$ by means of the vehicle sensor unit 6 as the verification fire parameter $K_V$ of the fire detector monitoring area 12 at the target location 16. This ensures a reliable determination of the verification fire parameter $K_V$ for the fire detector monitoring area 12, so that two independent fire parameters, namely the reference fire parameter $K_R$ and the verification fire parameter $K_V$, are then available for the fire detector monitoring area 12.

Figure 9:
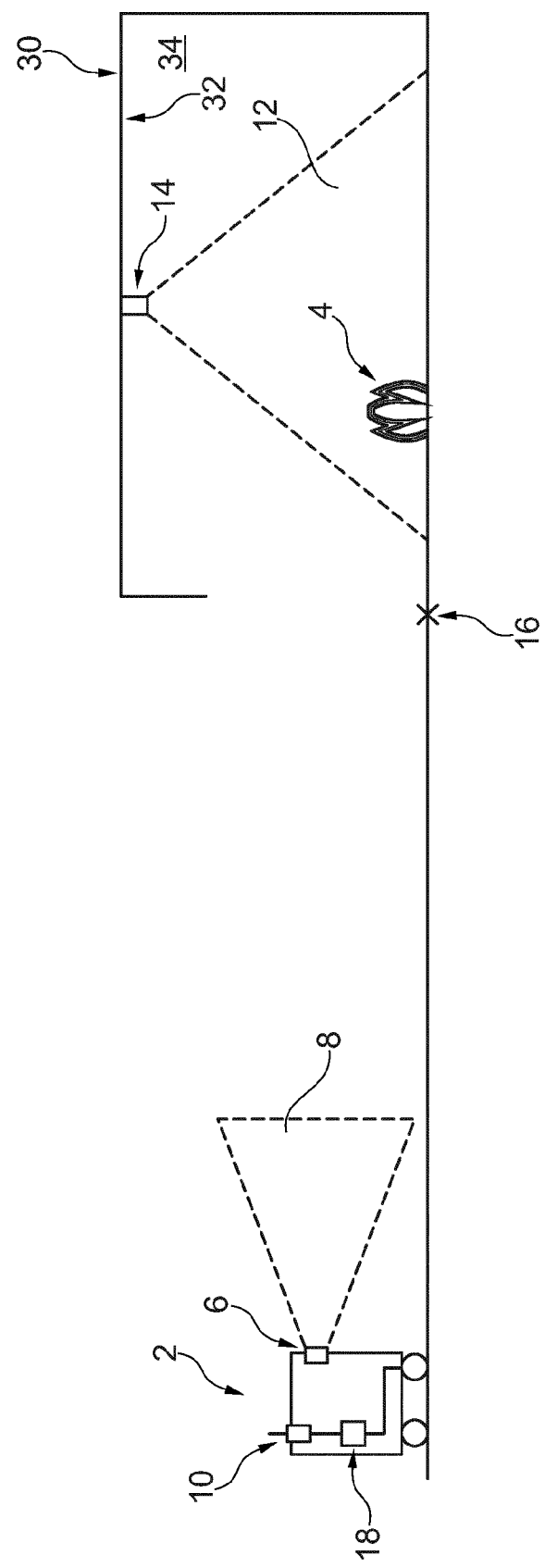
FIG. 9 shows an eighth embodiment of the system in a schematic illustration.

According to a further aspect of the invention, an unmanned vehicle 2 is provided. A corresponding unmanned vehicle 2 is illustrated schematically, for example, in FIG. 9. The unmanned vehicle 2 is also referred to as vehicle 2 hereinbelow. The vehicle 2 has a vehicle sensor unit 6, which is designed for capturing a fire parameter $K_F$ of a vehicle monitoring area 8. The vehicle 2 furthermore has a signal receiving unit 10, which, for receiving an instruction signal $S_I$, which represents at least one target location 16, at which the vehicle monitoring area 8 is in sufficient overlap with a fire detector monitoring area 12 of a fire detector 14, when the vehicle 2 is at the target location 16. The vehicle 2 furthermore has a navigation control unit 18. The navigation control unit 18 is designed and/or configured to independently navigate the vehicle 2 to the target location 16 on the basis of the received instruction signal $S_I$, so that the vehicle monitoring area 8 and the fire detector monitoring area 12 overlap sufficiently. The vehicle 2 is furthermore configured for capturing the fire parameter $K_F$ by means of the vehicle sensor unit 6 as a verification fire parameter $K_V$ of the fire detector monitoring area 12 at the target location 16. The vehicle 2 is furthermore designed for determining a verification fire status $Z_V$ by evaluating the verification fire parameter Ky. In particular as far as it is expedient, reference is made analogously to the preceding explanations, preferred features, effects and/or advantages, as they have been discussed before for the vehicle 2.

According to a preferred embodiment, the vehicle 2 is designed for transmitting a verification signal $S_V$, which represents the verification fire status $Z_V$, to a central unit 22 (not illustrated).

According to a preferred alternative embodiment of the vehicle 2, it is provided that the instruction signal $S_I$ furthermore represents a reference fire parameter $K_R$ of the fire detector monitoring area 12, the vehicle 2 is configured for determining the reference fire status $K_R$ as verified reference fire status $Z_{VR}$, in the event that the reference fire status $K_R$ and the verification fire status $K_V$ correspond at least sufficiently, and the vehicle 2 is designed for transmitting a verification signal $S_V$, which represents the verified reference fire status $Z_{VR}$, to the central unit 22.

For the unmanned vehicle 2 according to the above-explained second aspect of the invention, reference is made analogously to the preceding explanations, in particular with regard to the vehicle 2. The vehicle 2 can thus have corresponding embodiments and/or can provide corresponding advantages and/or effects.

The vehicle is thus preferably designed as an aircraft, in particular as a drone.

The signal receiving unit 10 of the vehicle 2 is preferably designed for receiving a signal, in particular the instruction signal $S_I$, from the central unit 22. With regard to this, reference is made analogously to corresponding explanations, preferred features, advantages and/or effects, as they have been discussed for the corresponding features for the vehicle 2 of the system.

Figure 10:
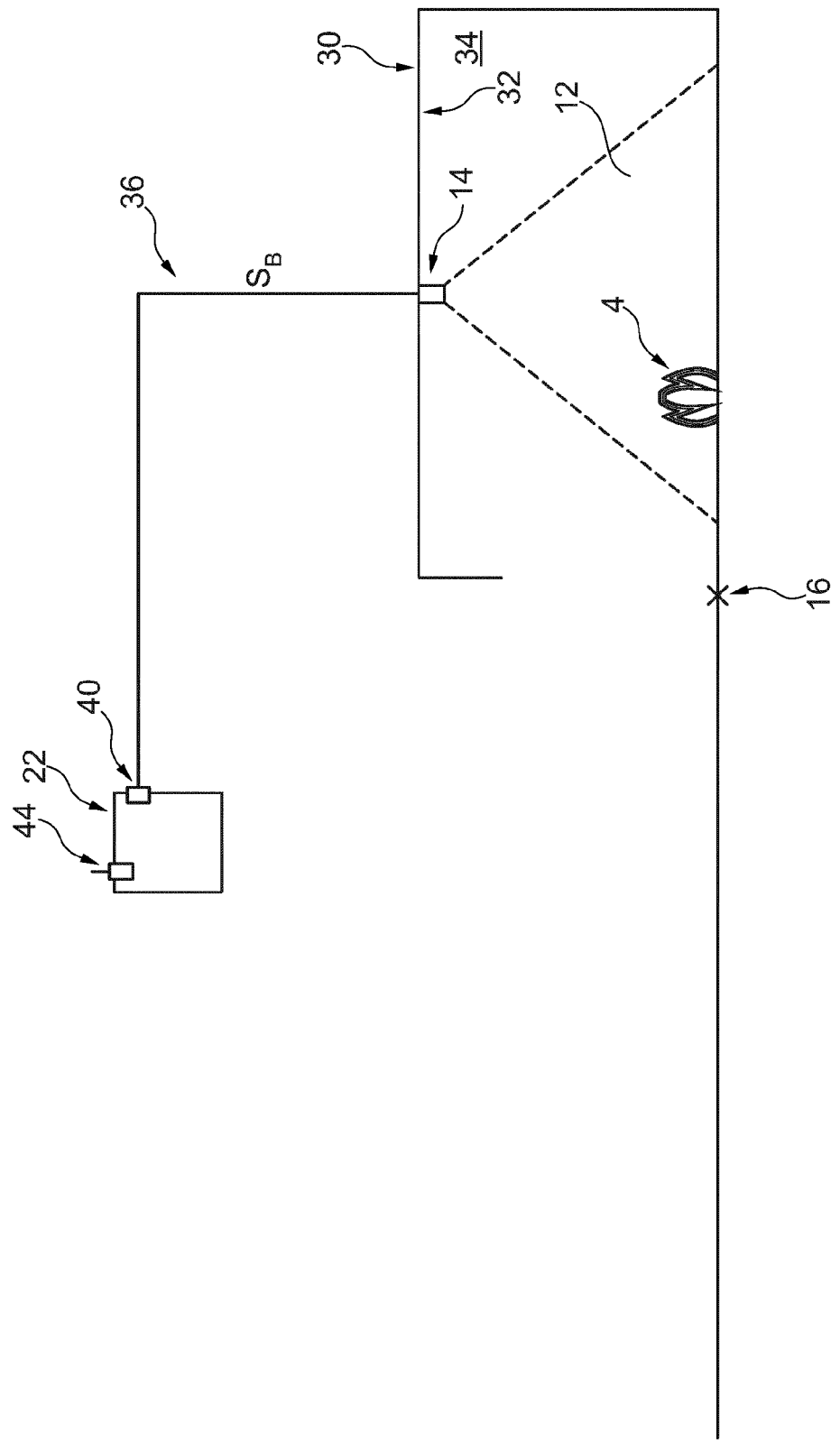
FIG. 10 shows a ninth embodiment of the system in a schematic illustration.

According to a third aspect of the invention, a central unit 22 is provided. The central unit 22 is illustrated schematically in FIG. 10. The central unit 22 is designed for receiving a fire detector signal $S_B$ of a fire detector 14. In the event that a fire detector signal $S_B$ received from the fire detector 14 represents a reference fire status $Z_R$, which needs to be verified, the central unit 22 is thereby configured for transmitting an instruction signal $S_I$ to a vehicle 2 (not illustrated). The instruction signal $S_I$ thereby represents at least one target location 16 for the vehicle 2. A vehicle monitoring area 8 of a vehicle sensor unit 6 of the vehicle 2 is thereby in sufficient overlap with a fire detector monitoring area 12 of the fire detector 14, when the vehicle 2 is at the target location 16, so that the vehicle 2 can capture a verification fire parameter $K_V$ of the fire detector monitoring area 12 by means of the vehicle sensor unit 6. The central unit 22 is furthermore designed for receiving a verification signal $S_V$, which represents a verification fire status $Z_V$, which corresponds to the verification fire parameter $K_V$, from the vehicle 2. The central unit 22 is furthermore configured for determining the reference fire status $Z_R$ as verified reference fire status $Z_{VR}$, in the event that the reference fire status $Z_R$ and the verification fire status $Z_V$ correspond at least sufficiently. With regard to the central unit 22, reference is made analogously to the advantageous explanations, preferred features, effects and/or advantages, as they have been described for the central unit 22 in connection with FIGS. 1 to 8.

The central unit 22 is preferably a fire detector and/or extinguishing control center or is at least partially formed thereby, in particular by the fire detector control center.

Figure 11:
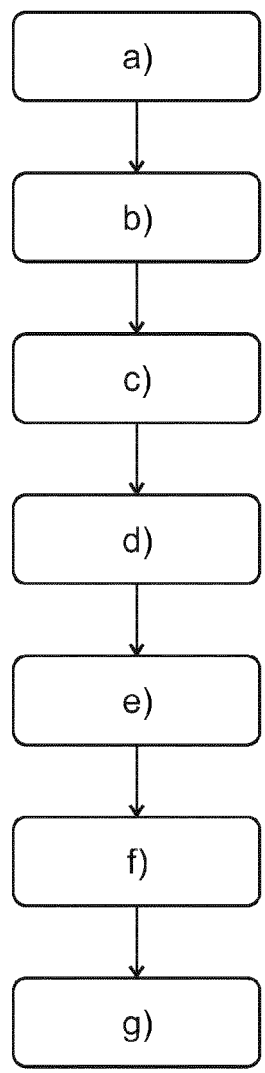
FIG. 11 shows a schedule of method steps of the method in a schematic illustration.
Figure 12:
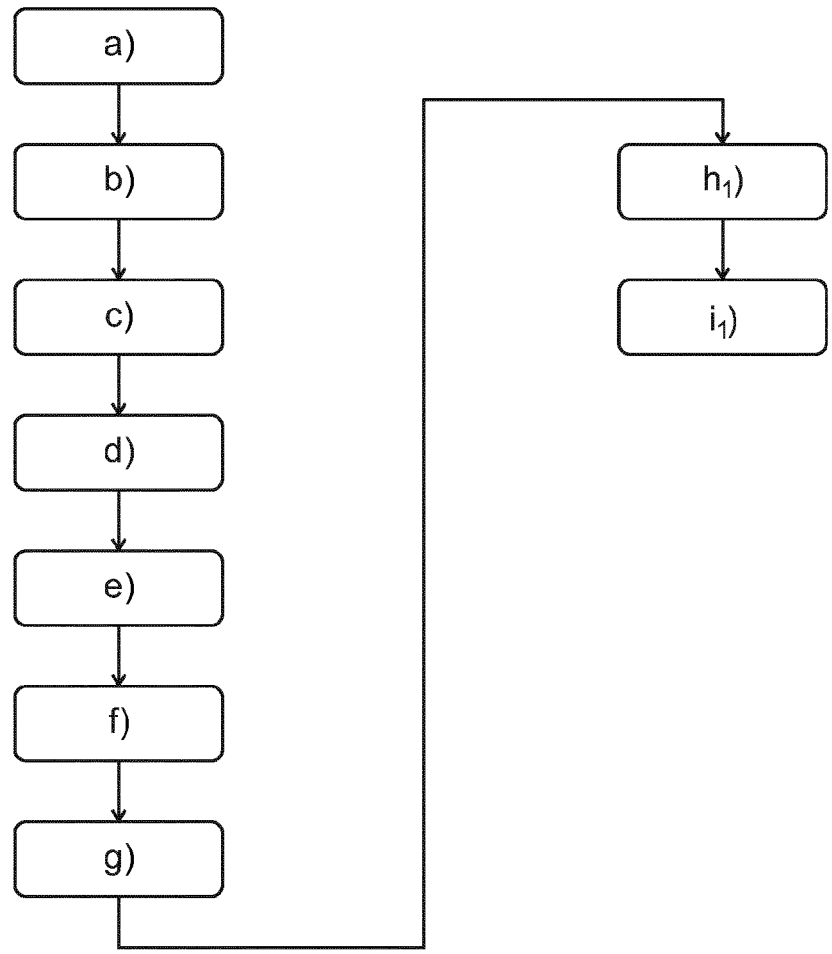
FIG. 12 shows a schedule of an embodiment of the method in a schematic illustration.

According to a fourth aspect of the invention, a method for the verified determination of a fire status is provided, wherein the steps of the method are illustrated schematically in FIGS. 11 and 12.

The method can be divided into two alternatives, namely a first alternative and a second alternative. The first alternative differs from the second alternative by the method steps h1) and j1) as compared to the method steps h2) and j) of the second alternative. To begin with, the remaining method steps a) to g) are identical for both alternatives and shall be explained.

According to step a), a capturing of a reference fire parameter $K_R$ of a fire detector monitoring area 12 by means of a fire detector sensor unit 28 of a fire detector 14 is provided.

According to step b), a determining of a reference fire status $Z_R$ by evaluating the reference fire parameter $K_R$ by means of the fire detector 14 is provided.

According to step c), a transmitting of a fire detector signal $S_B$, which represents the reference fire status $Z_R$, from the fire detector 14 to a central unit 22 is provided.

According to step d), a transmission of an instruction signal $S_I$ from the central unit 22 to a vehicle 2 is provided. In the event that the fire detector signal $S_B$, which is transmitted by the fire detector 14, represents a reference fire status $Z_R$, which needs to be verified, wherein the vehicle 2 has a vehicle sensor unit 6, which is designed for capturing a fire parameter $K_F$ of a vehicle monitoring area 8, and wherein the instruction signal $S_I$ represents at least one target location 16 for the vehicle 2, wherein the vehicle monitoring area 8 is in sufficient overlap with the fire detector monitoring area 12, when the vehicle 2 is at the target location.

According to step e), a navigating of the vehicle 2 is provided, namely preferably independently, to the target location 16, on the basis of the transmitted instruction signal $S_I$ by means of a navigation control unit 18 of the vehicle 2, so that the vehicle monitoring area 8 and the fire detector monitoring area 12 overlap sufficiently.

According to step f), a capturing of the fire parameter $K_F$ as a verification fire parameter $K_V$ of the fire detector monitoring area 12 by means of the vehicle sensor unit 6 is provided.

According to step g), a determining of a verification fire status $Z_V$ by evaluating the verification fire parameter $K_V$ by means of the vehicle 2 is provided.

In particular insofar as it is expedient, reference is made analogously for steps a) to g) to the preceding explanations, preferred features, effects and/or advantages, as they have been discussed before for the system 22 and/or vehicle 2.

As explained above, a first alternative of the method is characterized by steps h1) and i1), which are illustrated schematically in FIG. 12 in connection with the further steps a) to g).

According to step h1), a transmission of a verification signal $S_V$, which represents the verification fire status $Z_V$, from the vehicle to the central unit 22 is provided. According to step i1), a determining of a reference fire status $Z_R$ as verified reference fire status $Z_{VR}$ by means of the central unit 22 is provided, in the event that the reference fire status $Z_R$ and the verification fire status $Z_V$ correspond at least sufficiently. In particular insofar as it is expedient, reference is made analogously for steps h1) to i1) to the preceding explanations, preferred features, effects and/or advantages, as they have been discussed before for the system 22 and/or vehicle 2.

Figure 13:
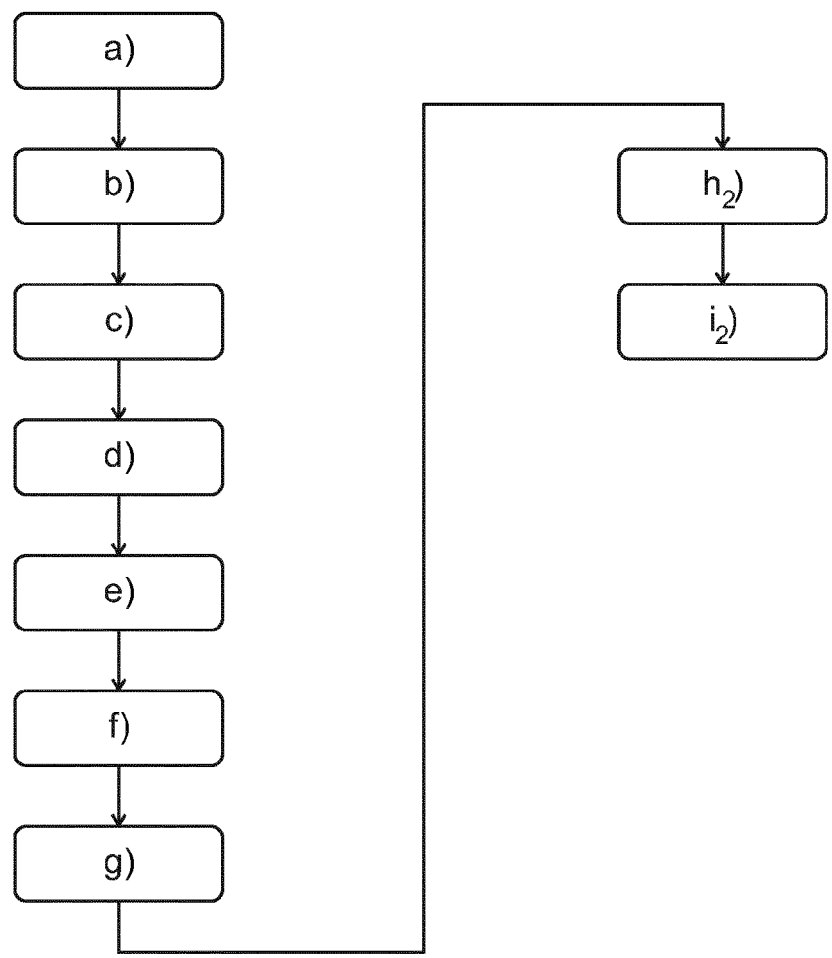
FIG. 13 shows a schedule of a further embodiment of the method in a schematic illustration.

According to the second alternative of the method, steps h2 and i2) are performed instead of steps h1) and i1). A combination of methods steps a) to g) and h2) and i2) is illustrated schematically in FIG. 13.

According to step h2), a determining of a reference status $Z_R$ as verified reference fire status $Z_{VR}$ by means of the vehicle 2 is provided, in the event that the reference fire status $Z_R$ and the verification fire status $Z_V$ correspond at least sufficiently, wherein the instruction signal $S_I$ furthermore represents the reference fire status $Z_R$. According to step i2), a transmission of a verification signal $S_V$, which represents the verified reference fire status $Z_{VR}$, to the central unit 22 is provided. In particular insofar as it is expedient, reference is made analogously for steps h2) to i2) to the preceding explanations, preferred features, effects and/or advantages, as they have been discussed before for the system 22 and/or vehicle 2.

LIST OF REFERENCE NUMERALS

| Numeral | Meaning |
|---|---|
| $K_F$ | fire parameter |
| $K_R$ | reference fire parameter |
| $K_V$ | verification fire parameter |
| $S_A$ | alarm signal |
| $S_B$ | fire detector signal |
| $S_F$ | false alarm signal |
| $S_I$ | instruction signal |
| $S_V$ | verification signal |
| t | time |
| $W_{S1}$ | first threshold value |
| $W_{S2}$ | second threshold value |
| $W_{S3}$ | third threshold value |
| $Z_R$ | reference fire status |
| $Z_{R1}$ | reference fire status corresponding to smoldering fire |
| $Z_{R2}$ | reference fire status corresponding to fire precursor |
| $Z_{R3}$ | reference fire status corresponding to fire |
| $Z_V$ | verification fire status |
| $Z_{VR}$ | verified reference fire status |
| 2 | vehicle |
| 4 | fire |
| 6 | vehicle sensor unit |
| 8 | vehicle monitoring area |
| 10 | signal receiving unit |
| 12 | fire detector monitoring area |
| 14 | fire detector |
| 16 | target location |
| 18 | navigation control unit |
| 20 | system |
| 22 | central unit |
| 24 | signal communication unit (of the vehicle) |
| 26 | signal communication unit (of the fire detector control center) |
| 28 | fire detector sensor unit |
| 30 | building |
| 32 | ceiling |
| 34 | room |
| 36 | signal line |
| 38 | signal transmitting unit (of the fire detector) |
| 40 | signal receiving unit (of the central unit) |
| 42 | signal connection |
| 44 | signal sending unit (of the central unit) |
| 46 | wheel |
| 48 | overlap |
| 50 | output unit |
| 52 | control center |
| 54 | signal connection |
| 56 | signal sending unit (of the central unit)) |
| 58 | signal receiving unit (of the control center) |
| 60 | output unit |
| 62 | output unit |
| 64 | extinguishing control center |
| 66 | signal connection |
| 68 | extinguishing installation |
| 70 | extinguishing nozzle |
| 72 | extinguishing agent source |
| 74 | pipeline |
| 76 | signal control line |
| 78 | rotor |
| 80 | rotary wing |
| 82 | image |
| 84 | fire location |
| 86 | aligning device |

The invention claimed is:

1. A system (20) for determining a verified fire status, having:
a central unit (22), a stationary fire detector (14) and an unmanned vehicle (2),
wherein the fire detector (14) has a fire detector sensor unit (28), which is designed for capturing a reference fire parameter $K_R$ of a fire detector monitoring area (12),
wherein the fire detector (14) is designed for determining a reference fire status $Z_R$ by evaluating the reference fire parameter $K_R$,
wherein the fire detector (14) is designed for transmitting a fire detector signal $S_B$, which represents the reference fire status $Z_R$, to the central unit (22),
wherein the central unit (22) is configured for transmitting an instruction signal $S_I$ to the vehicle (2), in the event that the fire detector signal $S_B$ transmitted by the fire detector (14) represents a fire detector status $Z_R$, which needs to be verified,
wherein the vehicle (2) has a vehicle sensor unit (6), which is designed for capturing a fire parameter $K_F$ of a vehicle monitoring area (8), wherein the instruction signal $S_I$ represents at least one target location (16) for the vehicle (2), wherein the vehicle monitoring area (8) is in sufficient overlap with the fire detector monitoring area (12), when the vehicle (2) is at the target location (16), wherein the vehicle (2) is designed for navigating, independently, to the target location (16) on the basis of the transmitted instruction signal $S_I$, so that the vehicle monitoring area (8) and the fire detector monitoring area (12) overlap sufficiently, wherein the vehicle (2) is configured for capturing the fire parameter $K_F$ at the target location (16) by means of the vehicle sensor unit (6) as a verification fire parameter $K_V$ of the fire detector monitoring area (12), wherein the vehicle (2) is designed for determining a verification fire status $Z_V$ by evaluating the verification fire parameter $K_V$, and wherein the vehicle (2) is either designed for transmitting a verification signal $S_V$, which represents the verification fire status $Z_V$, to the central unit (22), and the central unit (22) is configured for determining the reference fire status $Z_R$ as verified reference fire status $Z_{VR}$, in the event that the reference fire status $Z_R$ and the verification fire status $Z_V$ correspond at least sufficiently;

or wherein the instruction signal $S_I$ furthermore represents the reference fire status $Z_R$, the vehicle (2) is configured for determining the reference fire status $Z_R$ as verified reference fire status $Z_{VR}$, in the event that the reference fire status $Z_R$ and the verification fire status $Z_V$ correspond at least sufficiently, and the vehicle (2) is designed for transmitting the verification signal $S_V$, which represents the verified reference fire status $Z_{VR}$, to the central unit (22).

2. The system (20) according to the claim 1, wherein the vehicle (2) and/or the central unit (22) is or are designed, respectively, for determining an alarm signal $S_A$ on the basis of the verified reference fire status $Z_{VR}$.

3. The system (20) according to claim 1, wherein the vehicle (2) and/or the central unit (22) is or are designed, respectively, for determining a false alarm signal $S_F$, which represents a faulty determination of a reference fire status $Z_R$ and/or a non-verified reference fire status, in the event that the reference fire status $Z_R$ has been determined as non-verified reference fire status $Z_{VR}$.

4. The system (20) according claim 1, wherein the vehicle (2) is designed as an aircraft, a drone, a land vehicle, or a robot vehicle.

5. The system (20) according to claim 1, wherein the vehicle sensor unit (6) has a camera.

6. The system (20) according to claim 1, wherein the vehicle (2) is designed for determining a fire location (84) by means of the vehicle sensor unit (6) at the target location (16).

7. The system (20) according to claim 1, wherein the vehicle (2) is configured for determining the fire location (84) on the basis of a fire parameter $K_F$ captured at the target location (16).

8. The system (20) according to claim 1, wherein the vehicle (2) is designed for aligning the vehicle sensor unit (6) in the direction of the fire location (4).

9. The system (20) according to claim 1, wherein the vehicle (2) is configured for capturing the verification parameter when the vehicle sensor unit (6) is aligned in the direction of the fire location (84).

10. The system (20) according to claim 1, wherein the vehicle (2) has a rotatable and/or pivotable aligning device (86), to which the vehicle sensor unit (6) is fastened, wherein the vehicle (2) is designed for controlling the aligning device (86), in order to align the vehicle sensor unit (6).

11. The system (20) according to claim 1, wherein the vehicle (2) is designed as an autonomous vehicle for the independent navigation to the target location (16).

12. The system (20) according to claim 2, wherein
the system (20) has an extinguishing control center (64),
wherein the central unit (22) is designed for transmitting the alarm signal SA to the extinguishing control center (64), and
wherein the extinguishing control center (64) is designed for controlling an extinguishing installation (68) on the basis of the transmitted alarm signal SA for extinguishing a fire in the fire detector monitoring area (12), the reference fire parameter KR of which has been captured by the fire detector sensor unit (28) of the fire detector (14), which has transmitted the fire detector signal $S_B$ to the central unit (22).

13. An unmanned vehicle (2) for determining a verified fire status, having:
a vehicle sensor unit (6), which is designed for capturing a fire parameter $K_F$ of a vehicle monitoring area (8),
a signal receiving unit (10) for receiving an instruction signal $S_I$, which represents at least one target location (16), at which the vehicle monitoring area (8), is in sufficient overlap with a fire detector monitoring area (12), when the vehicle (2) is at the target location (16), and
a navigation control unit (18), which is designed for independently navigating the vehicle (2) to the target location (16) on the basis of the received instruction signal SI, so that the vehicle monitoring area (8) and the fire detector monitoring area (12) overlap sufficiently,
wherein the vehicle (2) is configured for capturing the fire parameter $K_F$ by means of the vehicle sensor unit (6) as a verification fire parameter $K_V$ of the fire detector monitoring area (12) at the target location (16),
wherein the vehicle (2) is configured for determining a verification fire status $Z_V$ by evaluating the verification fire parameter $K_V$,
and wherein
the instruction signal $S_I$ furthermore represents a reference fire parameter $K_R$ of the fire detector monitoring area (12), the vehicle (2) is configured for determining the reference fire status $K_R$ as verified reference fire status $Z_{VR}$, in the event that the reference fire status $Z_R$ and the verification fire status $Z_V$ correspond at least sufficiently, and the vehicle (2) is designed for transmitting a verification signal $S_V$, which represents the verified reference fire status $Z_{VR}$, to a central unit (22).

14. A central unit (22) for determining a verified fire status, wherein
the central unit (22) is designed for receiving a fire detector signal $S_B$ of a fire detector (14), the central unit (22) is configured, in the event that a fire detector signal $S_B$ received from the fire detector (14) represents a reference fire status $Z_R$, which needs to be verified, for transmitting an instruction signal $S_I$ to a vehicle (2),
wherein the instruction signal $S_I$ represents at least one target location (16) for the vehicle (2),
wherein a vehicle monitoring area (8) of a vehicle sensor unit (6) of the vehicle (2) is in sufficient overlap with a fire detector monitoring area (12) of the fire detector (14), when the vehicle (2) is at the target location (16), so that the vehicle (2) can capture a verification fire parameter $K_V$ of the fire detector monitoring area (12) by means of the vehicle sensor unit (6), wherein the central unit (22) is designed for receiving a verification signal $S_V$, which represents a verification fire status $Z_V$, which corresponds to the verification fire parameter $K_V$, from the vehicle (2), and wherein the central unit (22) is configured for determining the reference fire status $Z_R$ as verified reference fire status $Z_{VR}$, in the event that the reference fire status $Z_R$ and the verification fire status $Z_V$ correspond at least sufficiently.

15. The central unit (22) according to claim 14, wherein the central unit (22) is a fire detector and/or extinguishing control center or is at least partially formed thereby.

16. A method for determining a verified fire status, having the following steps:
    a) capturing a reference fire parameter $K_R$ of a fire detector monitoring area (12) by means of a fire detector sensor unit (28) of a fire detector (14);
    b) determining a reference fire status $Z_R$ by evaluating the reference fire parameter $K_R$ by means of the fire detector (14);
    c) transmitting a fire detector signal $S_B$, which represents the reference fire status $Z_R$, from the fire detector (14) to a central unit (22);
    d) transmitting an instruction signal $S_I$ from the central unit (22) to a vehicle (2), in the event that the fire detector signal $S_B$ transmitted by the fire detector (14) represents a reference fire status $Z_R$, which needs to be verified, wherein the vehicle (2) has a vehicle sensor unit (6), which is designed for capturing a fire parameter $K_F$ of a vehicle monitoring area (8), and wherein the instruction signal $S_I$ represents at least one target location (16) for the vehicle (2), wherein the vehicle monitoring area (8) is in sufficient overlap with the fire detector monitoring area (12), when the vehicle (2) is at the target location (16);
    e) navigating the vehicle (2), independently, to the target location (16) on the basis of the transmitted instruction signal $S_I$ by means of a navigation control unit (18) of the vehicle (2), so that the vehicle monitoring area (8) and the fire detector monitoring area (12) overlap sufficiently;
    f) capturing the fire parameter $K_F$ as a verification fire parameter $K_V$ of the fire detector monitoring area (12) by means of the vehicle sensor unit (6); and
    g) determining a verification fire status $Z_V$ by evaluating the verification fire parameter $K_V$ by means of the vehicle (2);

wherein the method either includes the steps:
    h1) transmitting a verification signal $S_V$, which represents the verification fire status $Z_V$, from the vehicle (2) to the central unit (22); and
    i1) determining the reference fire status $Z_R$ as verified reference fire status $Z_{VR}$ by means of the central unit (22), in the event that the reference fire status $Z_R$ and the verification fire status $Z_V$ correspond at least sufficiently;

or includes the steps:
    h2) determining the reference fire status $Z_R$ as verified reference fire status $Z_V R$ by means of the vehicle (2), in the event that the reference fire status $Z_R$ and the verification fire status $Z_V$ correspond at least sufficiently, wherein the instruction signal $S_I$ furthermore represents the reference fire status $Z_R$; and
    i2) transmitting a verification signal $S_V$, which represents the verified reference fire status $Z_{VR}$, to the central unit (22).

17. The method according to claim 16, including the step: determining an alarm signal $S_A$ by means of the vehicle (2) or by means of the central unit (22), respectively, wherein the alarm signal $S_A$ represents the verified reference fire status $Z_{VR}$, in the event that the reference fire status $Z_R$ has been determined as verified reference fire status $Z_{VR}$.

18. The method according to claim 16, including the step: determining a false alarm signal $S_F$ by means of the vehicle (2) or the central unit (22), respectively, wherein the false alarm signal $S_F$ represents a faulty determination of a reference fire status $Z_R$ and/or a non-verified reference fire status, in the event that the reference fire status $Z_R$ has not been determined as verified reference fire status $Z_{VR}$.

19. The method according to claim 16, including the further step: determining a fire location (84) by means of the vehicle sensor unit (6) of the vehicle (2), when the vehicle (2) is at the target location (16).

20. The method according to claim 19, including the further step: aligning the vehicle sensor unit (6) in the direction of the fire location (4).

21. The method according to claim 16, wherein the vehicle has a rotatable and/or pivotable aligning device (86), to which the vehicle sensor unit (6) is fastened, and wherein the method further includes the step: aligning the vehicle sensor unit (6) by means of the aligning device (86) in the direction of the fire location (84).

* * * * *